United States Patent
Mizude et al.

(10) Patent No.: US 10,674,035 B2
(45) Date of Patent: Jun. 2, 2020

(54) IMAGE PROCESSING DEVICE WITH FRAME REMOVAL

(71) Applicant: SHARP KABUSHIKI KAISHA, Sakai, Osaka (JP)

(72) Inventors: Kazuhiro Mizude, Sakai (JP); Kazuma Ogawa, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/178,593

(22) Filed: Nov. 2, 2018

(65) Prior Publication Data
US 2019/0141213 A1 May 9, 2019

(30) Foreign Application Priority Data

Nov. 7, 2017 (JP) ................................. 2017-214605

(51) Int. Cl.
*H04N 1/00* (2006.01)
*G06K 9/00* (2006.01)
*G06K 9/46* (2006.01)
*H04N 1/387* (2006.01)

(52) U.S. Cl.
CPC ....... *H04N 1/3873* (2013.01); *H04N 1/00816* (2013.01); *G06K 9/00456* (2013.01); *G06K 9/4604* (2013.01); *H04N 2201/0094* (2013.01); *H04N 2201/0098* (2013.01)

(58) Field of Classification Search
CPC ............. H04N 1/3873; H04N 1/00816; H04N 2201/0094; H04N 2201/0098; H04N 1/387; H04N 1/00
See application file for complete search history.

(56) References Cited

U.S. PATENT DOCUMENTS

| 8,688,579 B1* | 4/2014 | Ethington | H04N 1/40012 705/42 |
| 2005/0140991 A1* | 6/2005 | Ogiwara | H04N 1/3873 358/1.2 |
| 2006/0250659 A1* | 11/2006 | Contino | H04N 1/00432 358/296 |
| 2008/0100885 A1 | 5/2008 | Onishi | |
| 2009/0273818 A1* | 11/2009 | Matsui | H04N 1/00795 358/488 |
| 2011/0043874 A1* | 2/2011 | Saika | H04N 1/00816 358/475 |

(Continued)

FOREIGN PATENT DOCUMENTS

JP  2008-113075 A  5/2008

*Primary Examiner* — Juan M Guillermety
(74) *Attorney, Agent, or Firm* — ScienBiziP, P.C.

(57) ABSTRACT

Included are: a platen on which documents to be read are placed; an image input unit configured to read in one or a plurality of documents placed on the platen at one time; a storage unit configured to store entire image data including individual images of the documents read in at one time; an outer frame region removing unit configured to remove, from the entire image data, image data of an outer frame region at a perimeter edge portion of the platen, having a predetermined width; and an individual image cropping unit configured to crop individual images of one or a plurality of documents, from the entire image data after the image data of the outer frame region has been removed.

5 Claims, 12 Drawing Sheets

(56) References Cited

U.S. PATENT DOCUMENTS

| | | | |
|---|---|---|---|
| 2011/0273735 A1* | 11/2011 | Koura | G03G 15/5016 358/1.13 |
| 2013/0051671 A1* | 2/2013 | Barton | G06T 7/12 382/173 |
| 2015/0138595 A1* | 5/2015 | Sugimoto | H04N 1/0044 358/1.15 |
| 2016/0021270 A1* | 1/2016 | Misaka | H04N 1/401 358/461 |
| 2017/0155792 A1* | 6/2017 | Mizude | H04N 1/3873 |

\* cited by examiner

READ REGION OF PLATEN

READ REGION OF PLATEN

READ REGION OF PLATEN

ENTIRE IMAGE DATA

READ REGION OF PLATEN

READ REGION OF PLATEN

→ READ PROCESSING WITH PLATEN COVER OPENED

ENTIRE IMAGE DATA

OUTER FRAME REGION IMAGE

READ REGION OF PLATEN

READ REGION OF PLATEN

ENTIRE IMAGE DATA AFTER REMOVAL

INDIVIDUAL IMAGE g1

INDIVIDUAL IMAGE g2

ENTIRE IMAGE DATA AFTER REMOVAL

READ REGION OF PLATEN

CLOSE PLATEN COVER →

PLATEN
READ REGION OF PLATEN

ENTIRE IMAGE DATA

OUTER FRAME REGION IMAGE

READ REGION OF PLATEN

READ REGION OF PLATEN
ENTIRE IMAGE DATA AFTER REMOVAL

INDIVIDUAL IMAGE g1
INDIVIDUAL IMAGE g2
ENTIRE IMAGE DATA AFTER REMOVAL

READ REGION OF PLATEN

READ PROCESSING WITH PLATEN COVER OPENED →

ENTIRE IMAGE DATA

BLACK FRAME IMAGE

READ REGION OF PLATEN

BLACK FRAME IMAGE

READ REGION OF PLATEN     ENTIRE IMAGE DATA AFTER ADDING BLACK FRAME

INDIVIDUAL IMAGE g1
INDIVIDUAL IMAGE g2

ENTIRE IMAGE DATA AFTER REMOVAL

READ REGION OF PLATEN

CLOSE PLATEN COVER →

PLATEN
READ REGION OF PLATEN

ENTIRE IMAGE DATA

WHITE FRAME IMAGE
READ REGION OF PLATEN

WHITE FRAME IMAGE
READ REGION OF PLATEN
ENTIRE IMAGE DATA AFTER ADDING WHITE FRAME

INDIVIDUAL IMAGE g1
INDIVIDUAL IMAGE g2
ENTIRE IMAGE DATA AFTER ADDING WHITE FRAME

FIG. 7A
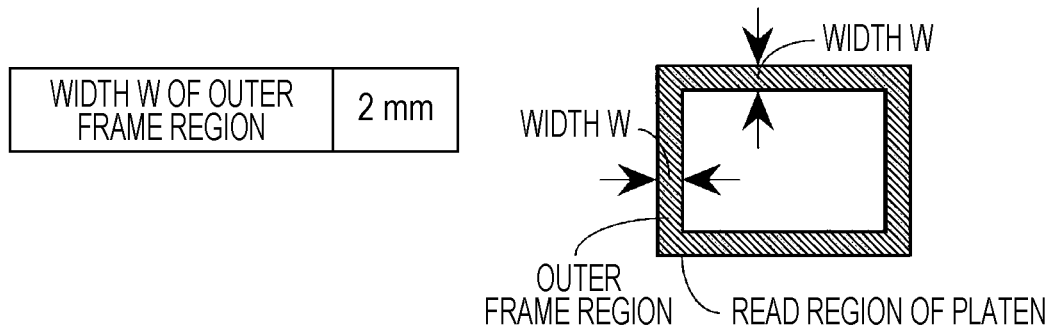
FIG. 7B
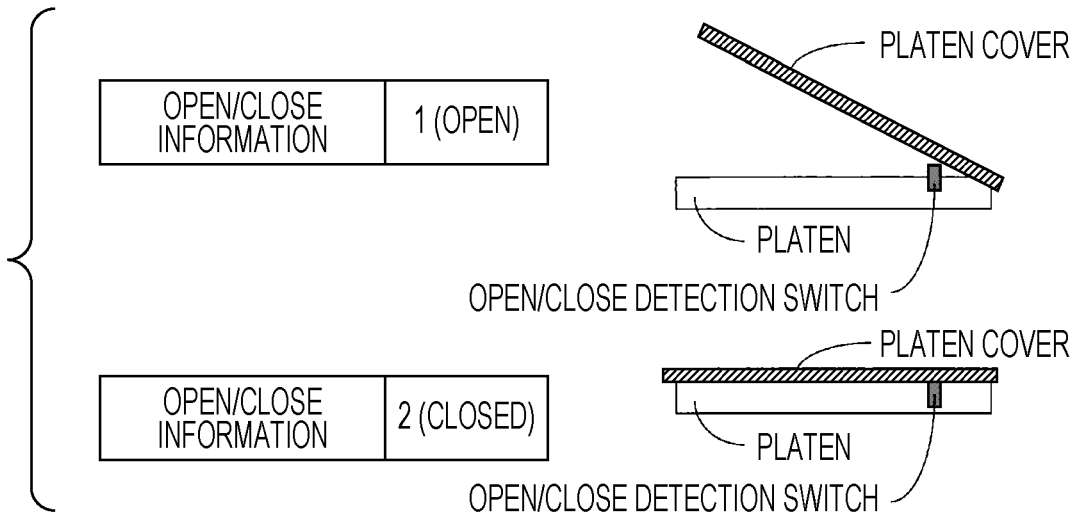
FIG. 7C
| INPUT IMAGE NO. | DOCUMENT APEX POSITION COORDINATES | | | | IMAGE DATA |
|---|---|---|---|---|---|
| NO.1 | P1 (x1, y1) | P2 (x2, y2) | P3 (x3, y3) | P4 (x4, y4) | IMG001 |
| NO.2 | P5 (x5, y5) | P6 (x6, y6) | P7 (x7, y7) | P8 (x8, y8) | IMG002 |

IMAGE PROCESSING DEVICE WITH FRAME REMOVAL

BACKGROUND

1. Field

The present disclosure relates to an image processing device.

2. Description of the Related Art

Image forming devices have been used heretofore. In recent years, multifunction peripherals, which have document reading (scanning) functions and network connection functions, in addition to document duplication functions, have come into use. As an example of a multifunction peripheral, there is a photocopier having a function where multiple documents such as business cards, driving licenses, receipts, cards, and other such documents are placed on a platen so as not to overlap each other, and the reading function is executed. Entire image data including image data of the multiple images is read, and multiple independent image data corresponding to the individual documents are cut out from the entire image data that has been read. This function will be referred to as multi-crop scanning function.

Japanese Unexamined Patent Application Publication No. 2008-113075 discloses an image processing device where the precision of multi-crop processing has been improved as follows, taking into consideration image data having been obtained with part of a document that was intended to be read being lost, due to the color or material thereof. After image data from multiple documents from scan data obtained by reading being extracted (cropped images), a predetermined reference region size is decided based on the size of multiple cropped images. Cropped images judged to be smaller than the reference region size are subjected to image cropping processing again with parameters used to detect cropped images having been changed, which is called cropping adjustment processing.

Normally, glass is fit into the reading region of the platen on which documents are placed. When reading the image data of the entire reading region of the platen, there are cases reading is performed including the perimeter of the glass, as one entire image data. There are cases here where image data at the edge of the perimeter of the glass included in the entire image data that has been read is recognized as an outline of a single document. In this case, image data on the inner side from the edge portion of the entire image data is cropped as an image equivalent to a single document, so cropping individual documents placed on the platen fails. This is being handled as follows. When performing a multi-crop scan, the scan operation is run with the platen cover opened, black image data (black frame image) is fit into the region at the perimeter edge portion of the entire image data that has been read, so that this portion will not be erroneously detected as being a document. Thereafter, image data cropping processing corresponding to the documents placed on the platen is performed.

The device according to Japanese Unexamined Patent Application Publication No. 2008-113075 can improve the precision of the range of cropping documents placed on the platen. However, in a case where image data on the inner side of the periphery edge portion of the glass in the entire image data that has been read is cropped as an image corresponding to a single document, individual image corresponding to each document are not cropped.

Also, in a case of performing a scan operation with the document cover open and embedding a black frame image at the outer frame region, as in the related art (referred to as multi-cropping function), each document can be successfully cropped with hardly any problems at all if the documents to be read such as papers, receipts, and so forth, are documents that have a wide white regions overall. However, embedding the black frame image at the outer frame region with documents of which there is wide black regions to read may result in a situation where the outline of each document is not correctly recognized. In a case of such documents that have wide black areas overall, closing the platen cover and performing a scan operation enables the outlines of the documents to be recognized, but the black frame image has been embedded, image data on the inner side of the outer frame region out of the entire image data including the black frame image is cropped as being an image equivalent to a single document, and consequently cropping of the individual documents fails.

On the other hand, with documents to be read that have wide areas of black regions overall or documents that are dark in color, such as photographs, each document can be correctly cropped by closing the platen cover and then performing a scan operations, and embedding white image data (white frame image) at the peripheral edge portion region (outer frame region) of the entire image data that has been read (referred to as photograph cropping function). However, there may be cases where, of the entire image data including the edge portion at the perimeter of the glass, the image data on the inner side of the outer frame region is cropped as an image corresponding to a single document, unless the white image frame is not embedded.

Also, there are cases where performing scan operations of documents that are photographs but have wide white regions overall, or are light in color, with the platen cover closed, results in the outline of each document not being correctly recognized. The outlines of individual documents with such wide white regions overall can be recognized by scanning with the platen cover opened. However, having the white frame image embedded at the outer frame region causes, of the entire image data including the white frame image, the image data on the inner side of the outer frame region to be cropped as an image corresponding to a single document, and consequently cropping of the individual documents fails.

As described above, even in cases where cropping of individual documents fails using the multi-crop function, cropping of individual documents may be successful using the photograph crop function. On the other hand, even in cases where cropping of individual documents fails using the photograph crop function, cropping of individual documents may be successful using the multi-crop function. However, the user has heretofore had to set beforehand which of the multi-crop function and photograph crop function to use, and in a case where cropping of documents fails, the user has had to perform an operation to switch the settings, placing a great burden of operations on the user. Further, opening and closing of the platen cover is performed by the user, and the user has to perform operations to set the functions with prior understanding of the relation between the multi-crop function and photograph crop function, and opening/closing of the paten cover. Accordingly, there has been a problem in that operations to use the multi-crop function are not easy to understand.

It is desirable to provide an image processing device where a situation in which, of entire image data including the edge region at the perimeter of the reading region of the platen (outer frame region), images on the inner side of the outer frame region are erroneously recognized as a single document, is prevented, and individual data corresponding to one or multiple read documents is obtained by easy operations corresponding to opening/closing operations of the platen cover performed by the user, thereby reducing the load of operations on the user.

SUMMARY

According to an aspect of the disclosure, there is provided an image processing device including a platen on which documents to be read are placed, an image input unit configured to read in one or a plurality of documents placed on the platen at one time, a storage unit configured to store entire image data including individual images of the documents read in at one time, an outer frame region removing unit configured to remove, from the entire image data, image data of an outer frame region at a perimeter edge portion of the platen, having a predetermined width, and an individual image cropping unit configured to crop individual images of one or a plurality of documents, from the entire image data after which the image data of the outer frame region has been removed.

According to an aspect of the disclosure, there is provided an image processing device including a platen on which documents to be read are placed, a platen cover configured to cover documents placed on the platen, an image input unit configured to read in one or a plurality of documents placed on the platen at one time, a storage unit configured to store entire image data including individual images of the documents read in at one time, a platen cover open/close detection unit configured to detect an open/close state of the platen cover, a frame image adding unit configured to add, to an outer frame region of the entire image data at a perimeter edge portion of the platen having a predetermined width, a frame image of a predetermined color, in accordance with the detected open/close state of the platen cover, and an individual image cropping unit configured to crop individual images of one or a plurality of documents, from the entire image data after which the frame image has been added to the outer frame region. The frame image adding unit includes a black-frame image adding unit configured to add, to the outer frame region, a black frame image made of image data of a black color, and a white-frame image adding unit configured to add, to the outer frame region, a white frame image made of image data of a white color.

According to an aspect of the disclosure, there is provided an image processing method of an image processing device. The method includes reading in one or a plurality of documents placed on a platen of the image processing device on which documents to be read are placed at one time, storing entire image data including individual images of the documents read in at one time, removing, from the entire image data, image data of an outer frame region at a perimeter edge portion of the platen, having a predetermined width, and cropping individual images of one or a plurality of documents, from the entire image data after which the image data of the outer frame region has been removed.

According to an aspect of the disclosure, there is provided an image processing method of an image processing device. The method includes reading in one or a plurality of documents placed on a platen of the image processing device on which documents to be read are placed at one time, storing entire image data including individual images of the documents read in at one time, detecting an open/close state of a platen cover of the image processing device configured to cover documents placed on the platen when the documents are read in at one time, adding, to an outer frame region of the entire image data at a perimeter edge portion of the platen having a predetermined width, a frame image of a predetermined color, in accordance with the detected open/close state of the platen cover, and cropping individual images of one or a plurality of documents, from the entire image data after which the frame image has been added to the outer frame region. When detecting the open/close state of the platen cover, a black frame image is added to the outer frame region of the entire image data in a case of detecting the platen cover being in an open state, and a white frame image is added to the outer frame region of the entire image data in a case of detecting the platen cover being in a closed state.

BRIEF DESCRIPTION OF THE DRAWINGS

FIGS. 2A-1 through 2A-5 are explanatory diagrams of an example of a reading region on a platen in the image processing device according to the present disclosure, and document placement;

FIGS. 3A-1 through 3A-5 are explanatory diagrams of an example of removing an outer frame region image, and thereafter obtaining image data of individual images, in the image processing device according to the present disclosure;

FIGS. 4A-1 through 4A-6 are explanatory diagrams of an example of removing an outer frame region image, and thereafter obtaining image data of individual images, in the image processing device according to the present disclosure;

FIGS. 5A-1 through 5A-5 are explanatory diagrams of an example of adding a black frame image to the outer frame region, and thereafter obtaining image data of individual images, in the image processing device according to the present disclosure;

FIGS. 6A-1 through 6A-6 are explanatory diagrams of an example of adding a white frame image to the outer frame region, and thereafter obtaining image data of individual images, in the image processing device according to the present disclosure;

FIGS. 7A through 7C are explanatory diagrams illustrating an example of information stored in a storage unit in the image processing device according to the present disclosure;

DESCRIPTION OF THE EMBODIMENTS

An embodiment of the present disclosure will be described below with reference to the drawings. Note that the present disclosure is not restricted by the following description of examples.

Configuration of Image Processing Device

Figure 1:
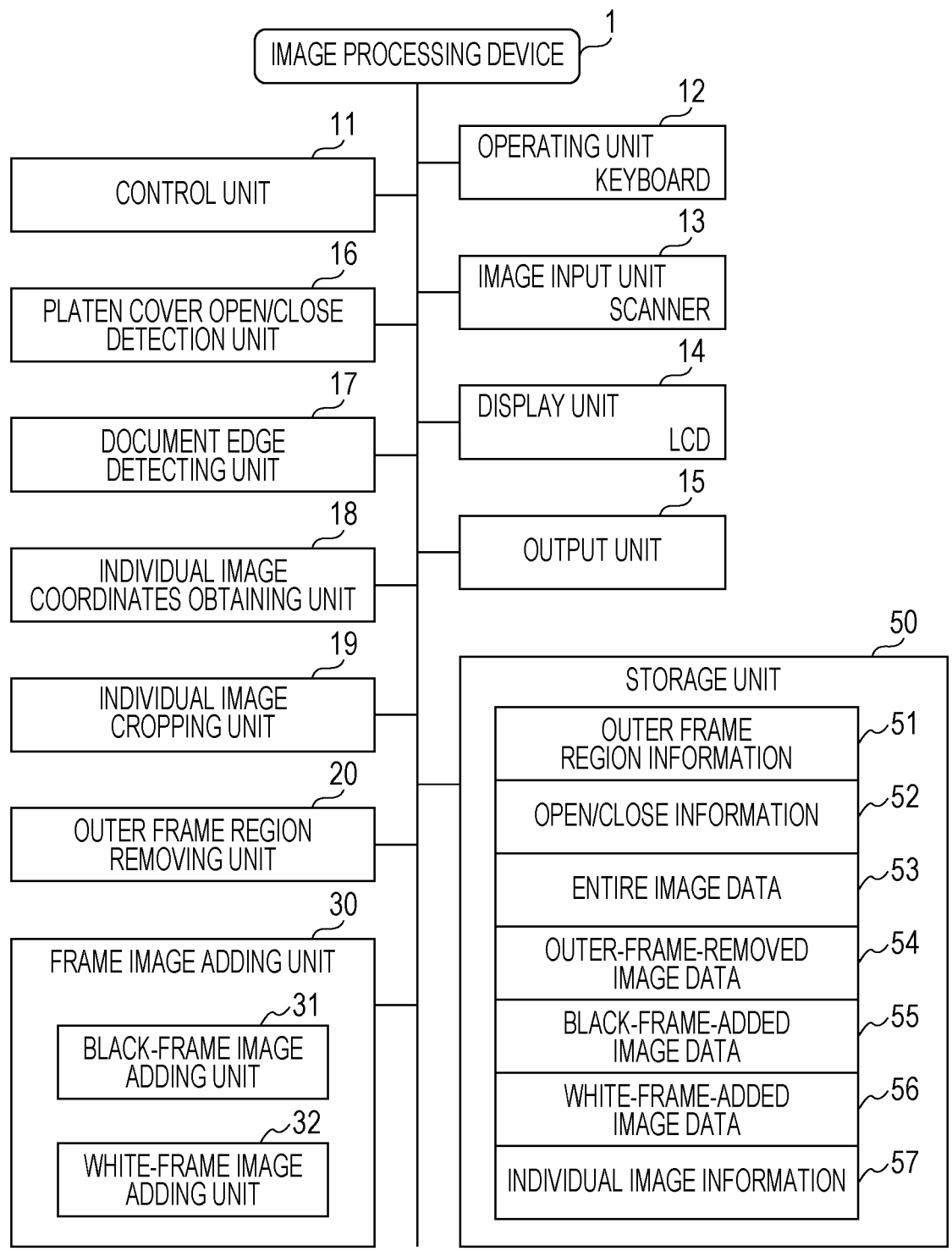
FIG. 1 is a configurational block diagram of an embodiment of an image processing device of the present disclosure.

FIG. 1 is a configurational block diagram of an example of an image processing device of the present disclosure. An image processing device (hereinafter also referred to as MFP) 1 is a device that processes image data, and is electronic equipment having, for example, copying functions, printing functions, document reading functions (scanning functions) facsimile functions, communication functions, and so forth. The image processing device 1 performs predetermined image processing using document reading functions in the present disclosure.

The image processing device 1 has a platen on which documents to be read are placed, to execute document reading functions. Also provided is a plate-shaped platen cover having an area somewhat larger than the reading area of the platen, to hold down documents from above, so that the one or more documents placed on the platen do not move. The platen cover is attached so as to be able to open and close as to the platen. A material such as glass that transmits light is also disposed in the reading region of the platen.

The user places one or multiple documents on the platen, so that the documents fit within the reading region of the platen, and performs predetermined operations to start reading, whereby information on one face of faces of the documents to be read is read as an image. The shape of the reading region of the platen is rectangular. Reading processing is performed with the platen cover one either an open state or a closed state as to the reading region of the platen. The opening and closer operations of the platen cover are performed by the user.

In the closed state, the platen cover is positioned covering above the reading region of the platen, and light emitted to the reading region of the platen for reading processing is reflected off of the platen cover and the documents, whereby the documents are read. In the open state, the platen cover is positioned not covering above the reading region of the platen, and of the light emitted to the reading region of the platen for reading processing, light transmitted through portions where there are no documents continues on straight without being reflected by the platen cover, while light that is reflected off of the documents placed on the platen is used to read the documents.

In FIG. 1, the image processing device (MFP) 1 according to the present disclosure includes a control unit 11, an operating unit 12, a display unit 14, an output unit 15, a platen cover open/close detection unit 16, an individual image coordinates obtaining unit 18, an individual image cropping unit 19 an outer frame region removing unit 20, a frame image adding unit 30, and a storage unit 50. The image processing device 1 may also include an image input unit 13 and an document edge detecting unit 17. The frame image adding unit 30 includes a black-frame image adding unit 31 and a white-frame image adding unit 32.

The control unit 11 is a part that controls operations of components, such as the image input unit and so forth, and is realized by a microcontroller including a central processing unit (CPU), read only memory (ROM), random access memory (RAM), an input/output (I/O) controller, timer, and so forth. The CPU causes various types of hardware to operate cooperatively, and thereby realize image input functions, individual image cropping functions, and so forth, of the present disclosure, based on a control program stored in ROM or the like beforehand.

The operating unit 12 is a part used for input of information such as text, and input of selection of functions. Examples include a keyboard, mouse, touch panel, or the like.

The image input unit 13 is a part that inputs image information, and in the present disclosure is a part that reads one or multiple documents placed on the platen at one time. For example, information of documents including images, text, shapes, and so forth, is input. The input information is stored in the storage unit 50 as electronic data. A scanner (reading device) that reads documents on paper or the like (hereinafter referred to as documents), where information has been printed, is used as the image input unit 13. There are various methods by which image information is input. An example is to read documents on which information is printed using a scanner, and electronic data of the entire reading region of the platen, including the documents, is stored in the storage unit 50 as entire image data that has been input.

Note however, that the method for inputting information such as images is not restricted to the above, and for example, an interface connected to an external storage medium such as Universal Serial Bus (USB) memory or the like may serve as the image input unit 13. An arrangement may be made where electronic data files such as images to be externally input or writing or the like are saved in an external storage medium such as USB memory or the like, The USB memory or the like is connected to an input interface such as a USB terminal or the like, and a predetermined operation is performed at the operating unit 12, thereby reading out a desired electronic data file saved in the USB memory or the like to be stored in the storage unit 50 as electronic data.

Generally, when reading a document using a scanner, the user places the document on a predetermined platen (also referred to as a document table), and preforms an input operation indicating that reading is to be started. When reading is started, normally, the entire reading region (reading face) of the platen is read as a single electronic datafile. In a case where the size of the document is smaller than the reading region of the platen, the electronic data that has been read (entire image data) contains the image of the document, but also contains information of portions where there is no document. In the present disclosure, the individual image cropping unit 19 is used to crop image data (individual images) of portions where documents are present, out of the electronic data (entire image data) that has been read, which will be described later.

The reading region of the platen normally is around as large as an A4 or A3 size sheet, so multiple documents that are smaller than the reading region of the platen, such as business cards, postcards, photographs, health insurance cards, credit cards, and so forth, can be placed on the platen without overlapping each other. Even in a case where multiple documents are placed on the patent and read using the scanner, the read information is generated and stored as a single electronic datafile (entire image data). In this case, image data of multiple documents (individual images) is included in the entire image data, so the image data of multiple documents (individual images) is cropped out from the entire image data that has been read.

Note however, that the entire image data that has been read includes a region at the perimeter edge portion (outer frame region) within the reading region of the platen. In the present disclosure, the entire image data that has been read is subjected to predetermined image processing, so that image data on the inner side of the outer frame region in the entire image data that has been read is not cropped as an image corresponding to a single document, and thereafter cropping of image data of the documents (individual images) is performed. The outer frame region here is the perimeter edge portion of the platen, and is used meaning a region having a predetermined width. In a case where the reading region of the platen on which documents are placed is rectangular, the outer frame region is a region on the inner side of the four sides of the rectangle, having a predetermined width W, as illustrated in FIG. 7A which will be described later.

Image processing that the entire image data that has been read is subjected to includes, for example, removing a predetermined outer frame region from the entire image data, and adding a black frame image or a white frame image to a predetermined outer frame region out of the entire image data, in accordance with the open/close state of the platen cover. This image processing will be described in detail later.

The display unit 14 is a part that displays information, and displays information for executing various functions, results of having executed functions, and so forth, to inform the user. Examples of the display unit 14 include a liquid crystal display (LCD) device, organic light-emitting diode (OLED) display device, or the like. In a case where a touch panel is used as the operating unit 12, the touch panel is disposed overlaid on the display unit.

In the present disclosure, in a case where the individual image cropping unit 19 is not able to crop individual images of the documents from the entire image data after adding the frame image, and in a case where the platen cover is in a closed state, a display may be made on the display unit 14 to place the platen cover in an open state and perform reading again, which will be described later. The user who sees this display opens the platen cover. Alternatively, in a case where individual images of the documents are not able to be cropped, and in a case where the platen cover is in an open state, a display may be made on the display unit 14 to place the platen cover in a closed state and perform reading again. The user who sees this display closes the platen cover. In a case where the platen cover open/close detection unit 16 detects thereafter than the open/close state of the paten cover has changed, the image input unit 13 may read the documents placed on the platen at one time, again.

The output unit 15 is a part that outputs image information generated from individual images, and corresponds to, for example, a printer that prints image information on a paper medium and outputs. In a case where there are multiple individual images, the output unit 15 composites several individual images based on information regarding an output method set beforehand, and prints on a single sheet as one set of image information. Note however, that output of the information is not restricted to printing, and may be storing information in an external storage medium such as USB memory or the like, or transmission of information to another information processing device or a server via a network such as the Internet or the like.

The platen cover open/close detection unit 16 is a part that detects the cover open/close state of the platen cover, i.e., detects which of the open state and closed state the platen cover current is in. An example of the platen cover open/close detection unit 16 is a pushbutton switch. A pushbutton switch (hereinafter also referred to as open/close detection switch) is provided on the platen so as to come into contact with the platen cover when an operation of closing the platen cover is performed, and accordingly the pushbutton switch is in a pressed state when the platen cover is in a closed state. When the platen cover is in an open state, the pushbutton switch is in a non-pressed state.

That is to say, when the pushbutton switch is in a pressed state, detection is made that the platen cover is in a closed state (the platen cover is closed). On the other hand, when the pushbutton switch is not in a pressed state, detection is made that the platen cover is in an open state (the platen cover is open). In a case where detection is made that the platen cover is in a closed state, information indicating the closed state (e.g., 0: closed) is stored as open/close information in the storage unit 50, which will be described later. In a case where detection is made that the platen cover is in an open state, information indicating the open state (e.g., 1: open) is stored as open/close information in the storage unit 50, which will be described later.

The document edge detecting unit 17 may be a part that detects the outline (edge) of individual images corresponding to documents, out of the entire image data obtained by the image input unit 13. Any conventionally-used method may be used for the method of detecting outlines of individual images. If a document is rectangular in shape, the outline of the individual image corresponding to that document may be detected as information by which the four sides of the rectangle can be identified. In a case where there are multiple documents to be read, the outlines of multiple individual images are detected from the entire image data.

Also, outlines of individual images corresponding to documents may be detected from the entire image data after having removed the image data of the outer frame region from the entire image data stored in the storage unit in the present disclosure, to improve the detection precision of outlines of individual images, which will be described later. Alternatively, outlines of individual images corresponding to documents may be detected from the entire image data after having added an image frame to the outer frame region, from the entire image data stored in the storage unit.

In a case where the document edge detecting unit 17 has been able to detect outlines of individual images corresponding to the documents, positions of individual images may be identified from the detected outlines of the individual images, and the individual images of which the positions have been identified may be cropped by the individual image cropping unit 19. Conversely, if outlines of individual images corresponding to the documents are not able to be detected, positions of individual images are not able to be identified from the detected outlines of the individual images, so the individual images are not able to be cropped.

The individual image coordinates obtaining unit 18 is a part that obtains opposition of individual images to be cropped, using information identifying the outlines of individual images detected by the document edge detecting unit 17. More specifically, coordinate values indicating positions of individual images to be cropped, as to the reading region of the platen, are obtained. Coordinate values indicating the position of individual images to be cropped are coordinates defining the positions of the documents placed on the reading region of the platen, and are referred to as document apex position coordinates. The document apex position coordinates are X coordinates and Y coordinates in an X-Y coordinate system set on the reading region of the plant. In a case where the document is rectangular in shape, the document apex position coordinates are the four apex X-Y coordinate values of the rectangle.

Figures 1, 2A:
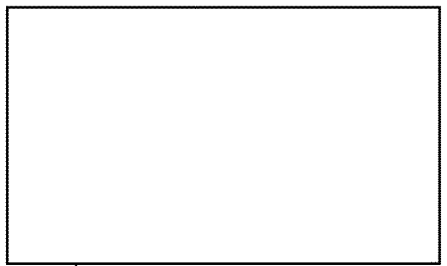
Figures 2, 2A:
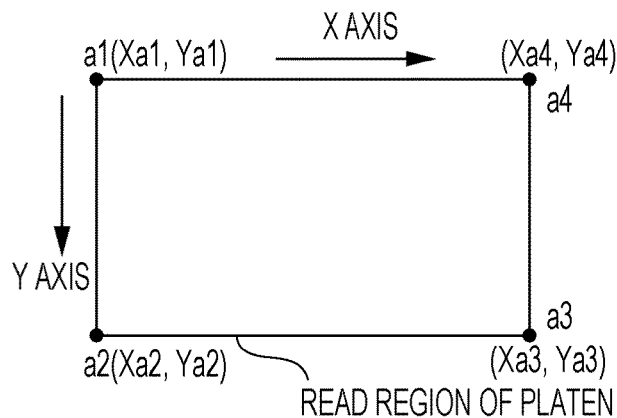

FIGS. 2A-1 through 2A-5 are explanatory diagrams illustrating the reading region of the platen and an example of a way of placing documents. FIG. 2A-1 illustrates the reading region of the platen. The reading region of the platen is a rectangle that is long in the horizontal direction. FIG. 2A-2 illustrates an example of X-Y coordinate values of four apices defining the reading region of the platen. The reading region of the platen in FIG. 2A-2 is a rectangle defined by the four apices (a1, a2, a3, a4). The apex a1 of the rectangle is the point of origin of the X-Y coordinate system, with the direction of the long side of the rectangle being the X axis, and the short side of the rectangle the Y axis, as illustrated in FIG. 2A-2. In this case, the positions of the four apices (a1, a2, a3, a4) of the rectangle that is equivalent to the reading region of the platen are expressed by the X-Y coordinate values illustrated in FIG. 2A-2.

Figures 2, 2A, 3:
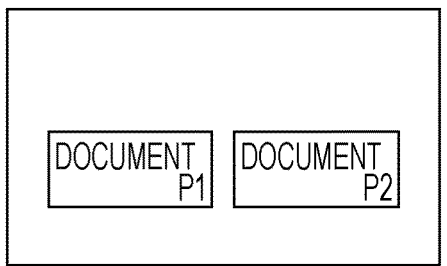

FIG. 2A-3 illustrates an example of two documents (P1 and P2) arranged in the reading region of the platen. The positions of the two documents is not restricted to that illustrated, and may be any positions as long as within the reading region of the platen. The number of documents to be placed is not restricted to two, and may be one, or may be three or more.

FIG. 2A-4 schematically illustrates an example of entire image data obtained by the image input unit 13. In a case where two documents (P1 and P2) are laid out as illustrated in FIG. 2A-3, and if reading is performed normally, image data of individual images is obtained corresponding to the documents (P1 and P2) at the respective positions thereof. FIG. 2A-4 also illustrates that the perimeter edge portion of the reading region of the platen is included in the obtained entire image data as an image of the outer frame region. Although FIG. 2A-4 illustrates the image of the outer frame region in an enhanced manner to describe that the image of the outer frame region may be included in the entire image data, such a clear outer frame region image is not obtained in actual practice.

However, if an image with such a clear outer frame region were obtained, this outer frame region would be recognized as the outline of a single document when cropping individual images, and the entire image data would be cropped as an individual image of a single document. If this happens, the portions of the two documents (P1 and P2) within the entire image data would be considered to be images within the single document, and would not be cropped as individual images. Accordingly, the later-described image processing is performed on the outer frame region of the entire image data that has been read in the present disclosure, to prevent the outer frame region portion from being recognized as the outline of a single document which would result in the entire image data being cropped as an individual image of a single document.

FIG. 2A-5 illustrates an example of the relation between the reading region of the platen and the coordinate positions of the documents in a case where two documents are placed in the reading region of the platen. In FIG. 2A-5, the document P1 is a rectangular portion surrounded by four apices (P1, P2, P3, P4), and the document P2 is a rectangular portion surrounded by four apices (P5, P6, P7, P8). The individual image coordinates obtaining unit 18 uses information identifying the outlines of the individual images, detected by the document edge detecting unit 17, and obtains the position coordinates (document apex position coordinates) of these eight apices. These eight apex position coordinates (document apex position coordinates) are expressed by X-Y coordinate values in the same X-Y coordinate system as the reading region of the platen. The document apex position coordinates are stored in the storage unit 50 as information identifying individual images to be cropped (individual image information), which will be described later.

The individual image cropping unit 19 is a part that crops individual images of one or multiple documents read at one time. For example, image data is cropped for the portions of documents that have been read, out of the entire image data input by the image input unit 13. Image data of the portions of documents that have been read is referred to as individual images. Cropping of individual images uses coordinates indicating the positions of the four apices (document apex position coordinates) of the individual images obtained by the individual image coordinates obtaining unit 18. Image data of the portions in the entire image data surrounded by the positions of the four apices is cropped, and stored in the storage unit 50 as image data of individual images.

In the present disclosure, individual images of one or multiple documents is cropped from entire image data after image data of the outer frame region has been removed. Alternatively, individual images of one or multiple documents is cropped from entire image data after a later-described frame image has been added to the outer frame region.

In a case where the number of documents to be read is one, image data of the portion where that one document is present in the input entire image data is extracted. In a case where multiple documents have been placed on the platen and reading is performed, image data of multiple documents is included in the input entire image data, so image data of respective portions where the multiple documents are present is extracted. For example, in a case where four documents are placed on the platen and reading is performed, image data corresponding to each of the four documents is extracted. Functions of cropping the individual images by the individual image cropping unit 19 is equivalent to so-called multi-crop scanning functions, and conventionally-used technology may be used.

The outer frame region removing unit 20 is a portion that removes image data of a region having a predetermined width at the perimeter edge portion of the platen (outer frame region) from the entire image data input by the image input unit 13. Information that would result in the image data within the perimeter edge portion being cropped as an image corresponding to a single document may be obtained in the outer frame region portion in the entire image data that has been input, as described above. Accordingly, image data of the outer frame region portion is removed, assuming that no document has been placed in this outer frame region portion. Entire image data after the image data of the outer frame region is removed is temporarily stored in the storage unit 50 as outer-frame-removed image data which will be described later.

After having removed the image data of the portion of the outer frame region, edge detection, obtaining of position coordinates of individual images, and cropping of individual images, is performed regarding the image data on the inner side of the outer frame region. Thus, the probability of erroneous detection of individual images can be reduced, by removing the image data of the portion of the outer frame region from the input entire image data, before performing cropping of individual images.

The size of the outer frame region to be removed is set beforehand in the storage unit 50 as outer frame region information, which will be described later. For example, a region having a width of W centimeters or so near the four sizes defining the reading region, on the inner side of the reading region of the platen that is rectangular in shape, is set as the size of the outer frame region. That is to say, the width W near the four sizes is set beforehand as the outer frame region information. It should be noted that a value appropriate for the width W near the four sizes that decides the outer frame region differs depending on the precision of the scanner reading images, and so forth, and accordingly cannot be uniformly set. Still, a value around 1 to 3 millimeters, for example, may be set beforehand as the value for the width W.

If a document is placed in the outer frame region portion that has been set, that document will not be able to be cropped, so setting a large value for the width W is not desirable. The value desirably is minimal within a range where erroneous detection of individual images can be prevented by the outer frame region. The value for the outer frame region information may be able to be set to a fixed value beforehand, during adjustment before shipping for example, or may be able to be changed as appropriate by one managing the image processing device or maintenance staff. All four sides may be different values.

Further, a display is preferably made on the display unit 14 before placing of the documents, to draw attention of the user to the fact that documents are to be placed W millimeters or more away from the perimeter of the reading region of the platen, on the inner side. Now, in a case where image data at the outer frame region portion is to be removed, there is no erroneous detection of individual images based on the image data at the outer frame region portion, so removable of image data of the outer frame region can be performed regardless of the open or closed state of the platen cover, so open/close detection of the platen cover does not have to be performed.

The frame image adding unit 30 is a portion that adds a frame image of a predetermined color to a region out of the obtained entire image data that is at the perimeter edge portion of the platen and that has a predetermined width (outer frame region), in accordance with the open/close state of the platen cover that has been detected. The frame image adding unit 30 includes the black-frame image adding unit 31 that adds a black frame image made up of black image data, and a white-frame image adding unit 32 that adds a white frame image made up of white image data in the outer frame region.

The black-frame image adding unit 31 is a portion that adds a black frame image made up of black image data to a region out of the obtained entire image data input by the image input unit 13 that is at the perimeter edge portion of the platen (outer frame region). For example, the outer frame region where the black frame image is to be added may be the same size as the above-described outer frame region that is removed. Alternatively, the size of the outer frame region where the black frame image is to be added may be set beforehand, separately from the size of the outer frame region to be removed.

In a case where the platen cover open/close detection unit 16 has detected that the platen cover is in an open state, the black frame image may be added to the outer frame region of the entire image data. Adding of the black frame image is performed after the entire image data is obtained and before cropping of individual images is performed, including edge detection. The entire image data to which the black frame image is added at the outer frame region is temporarily stored in the storage unit 50 as black-frame-image added data, which will be described later.

That is to say, in a case where the platen cover open/close detection unit 16 has detected that the platen cover is open, a black frame image may be added to the outer frame region regardless of the color or darkness/lightness of the document. When the platen cover is open, light is transmitted through portions where there are no documents in the reading region of the platen, so portions of the entire image data where there are no documents are obtained as a blackish image in the entire image data. However, the outer frame region portion of the reading region may be obtained as a lighter image than the blackish image, and there may be cases where the outer frame region portion is erroneously recognized as being the outline of a single document. Accordingly, replacing the outer frame region portion with a black image having a darkness equivalent to that of portions where there are no documents enables erroneous cropping of the outer frame region portion as a single document to be prevented.

The white-frame image adding unit 32 is a portion that adds a white frame image made up of white image data to a region out of the obtained entire image data input by the image input unit 13 that is at the perimeter edge portion of the platen (outer frame region). For example, the outer frame region where the white frame image is to be added may be the same size as the above-described outer frame region that is removed. Alternatively, the size of the outer frame region where the white frame image is to be added may also be set beforehand, separately from the size of the outer frame region to be removed.

In a case where the platen cover open/close detection unit 16 has detected that the platen cover is in a closed state, the white frame image may be added to the outer frame region of the entire image data. Adding of the white frame image is performed after the entire image data is obtained and before cropping of individual images is performed, including edge detection. The entire image data to which the white frame image is added to the outer frame region is temporarily stored in the storage unit 50 as white-frame-image added data which will be described later.

That is to say, in a case where the platen cover open/close detection unit 16 has detected that the platen cover is closed, a white frame image may be added to the outer frame region regardless of the color or darkness/lightness of the document. When the platen cover is closed, light is reflected off of the platen cover portions where there are no documents in the reading region of the platen, so portions of the entire image data where there are no documents are obtained as a whiteish image in the entire image data. However, the outer frame region portion of the reading region may be obtained as a darker image than the whiteish image, and there may be cases where the outer frame region portion is erroneously recognized as being the outline of a single document. Accordingly, replacing the outer frame region portion with a white image having a lightness equivalent to that of portions where there are no documents enables erroneous cropping of the outer frame region portion as a single document to be prevented.

The storage unit 50 is a part that stores information and programs for executing the functions of the image processing device according to the present disclosure. Semiconductor storage devices such as ROM, RAM, flash memory, or the like, storage device such as a hard disk drive (HDD), solid state drive (SSD), or the like, or other storage media, may be used for the storage unit 50. The storage unit 50 stores, for example, outer frame region information 51, open/close information 52, entire image data 53, outer-frame-removed image data 54, black-frame-added image data 55, white-frame-added image data 56, individual image information 57, and so forth. FIGS. 7A through 7C are explanatory diagrams illustrating examples of information stored in the storage unit 50 of the image processing device.

The outer frame region information 51 is information setting the size of the outer frame region, as described above, with a value for the width W of the outer frame region being set beforehand, for example. The outer frame region is a region near the perimeter edge portion of the reading region of the platen, in the shape of a frame having a width W, as illustrated in FIG. 7A. FIG. 7A illustrates a case where 2 mm has been set as the width W of the outer frame region. However, the width W of the outer frame region is not restricted to this value, and may be set to another value. The width W of the outer frame region further may be set as a fixed value, or alternatively as a value regarding which settings can be changed. Moreover, each of the four sides may be set to a different value.

The open/close information 52 stores the open/close state of the platen cover. A predetermined value is stored by output from an open/close detection switch corresponding to the platen cover open/close detection unit 16. The open/close detection switch is provided at the edge portion of the platen, so as to be capable of contact with the platen cover, as illustrated in FIG. 7B. In a case where the platen cover is in an open state as illustrated in FIG. 7B, for example, part of the open/close detection switch protrudes further upwards from the surface of the platen, and the open/close detection switch is not in a pressed state.

On the other hand, in a case where the platen cover is in a closed state, the open/close detection switch is pressed downwards by the platen cover so as to be retracted to inside of the platen, a contact of the open/close detection switch is closed, for example, and a signal indicating a closed state is output. In a case of having received a signal indicating the closed state, the control unit 11 stores a value 0 indicating the closed state of the platen cover as the open/close information 52, for example. In a case where no signal indicating this closed state has been received, a value 1 indicating the open state of the platen cover is stored as the open/close information 52, for example. This open/close information 52 is used to automatically decide whether to add a black frame image to the outer frame region, or to add a white frame image to the outer frame region, as described above.

The entire image data 53 is image data input by the image input unit 13, and is data obtained from the entire reading region of the platen. The entire image data 53 includes individual images of documents read at one time, and also includes image data of the outer frame region.

The outer-frame-removed image data 54 is data where image data of the outer frame region portion has been removed from the entire image data 53. The outer frame region removing unit 20 removes image data of the outer frame region portion based on the outer frame region information 51 set beforehand, and generates outer-frame-removed image data 54. The outer-frame-removed image data 54 is data that is smaller than the entire image data 53 and is on the inner side of the outer frame region. Edge detection of documents and cropping of individual images is performed using the outer-frame-removed image data 54 after the image data of the outer frame region portion has been removed.

The black-frame-added image data 55 is data where the black frame image, that is black in color, has been added to the outer frame region portion of the entire image data 53. That is to say, the black-frame-added image data 55 is data where the image data of the outer frame region portion of the input entire image data 53 has been replaced with the black frame image.

The white-frame-added image data 56 is data where the white frame image, that is white in color, has been added to the outer frame region portion of the entire image data 53. That is to say, the white-frame-added image data 56 is data where the image data of the outer frame region portion of the input entire image data 53 has been replaced with the white frame image.

The individual image information 57 is information for each individual image that has been cropped, and includes input image No., document apex position coordinates, and image data, for example. FIG. 7C illustrates an example of individual image information 57 in a case where two documents are placed on the platen and individual images corresponding to the two documents have been cropped, as illustrated in FIG. 2A-5. The individual image with input image No. 1 in FIG. 7C, for example, indicates that it has been cropped from a position indicated by document apex position coordinates of the four apices (P1, P2, P3, P4), and is stored as an image data file named IMG001.

The individual image with input image No. 2 indicates that it has been cropped from a position indicated by document apex position coordinates of the four apices (P5, P6, P7, P8), and is stored as an image data file named IMG002. When outputting individual images, image information to be output is generated using such individual image information 57, and output processing such as printing or transmission is performed by the output unit 15.

Example of Cropping Processing of Individual Images

Next, processing of cropping individual images corresponding to documents from the input entire image data will be described. In the present disclosure, individual images are cropped after having subjected image data in the outer frame region of the input entire image data to one of the following image processing, thereby obtaining image data of individual images.

Processing of removing image data at the outer frame region from the input entire image data is performed as a first example of image processing. Processing of adding a black frame image or adding a white frame image to the outer frame region of the input entire image data is performed as a second example of image processing. In a case where the platen cover is in an opened state, the black frame image may be added to the outer frame region, and in a case where the platen cover is in a closed state, the white frame image may be added to the outer frame region.

Which of the two image processing to perform may be initially set beforehand according to which image processing the user will perform at an initial stage of using the image processing device, for example. Alternatively, an arrangement may be made where initial settings are made beforehand to perform the image processing of the first example as a general rule, and if the user wants to perform image processing of the second example, input operations are performed to change the image processing to be executed to the image processing of the second example. Conversely, an arrangement may be made where initial settings are made beforehand to perform the image processing of the second example, and if the user wants to perform image processing of the first example, input operations are performed to change the image processing to be executed to the image processing of the first example.

Further, an arrangement may be made where the image processing of the first example is performed on the input entire image data as a general rule, to perform cropping of individual images, and if cropping of individual images is not successful, processing of the second example is automatically performed on the same input entire image data, to perform cropping of individual images. The order of performing these two image processing may be opposite in this case as well.

First Example

FIGS. 3A-1 through 3A-5 are explanatory diagrams illustrating an example of obtaining image data of individual images after having removed the outer frame region image.

FIGS. 3A-1 through 3A-5 illustrate a case of obtaining entire image data with the platen cover open (in an opened state). Generally, when reading documents with many white portions, reading is preferably performed with the platen cover open, to improve the precision of cropping individual images.

Figures 1, 3A:
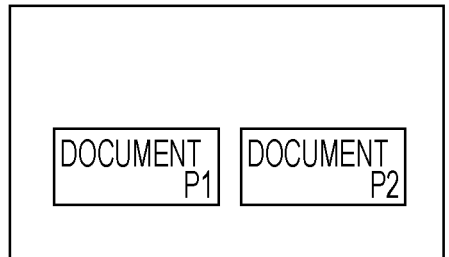
Figures 2, 3A:
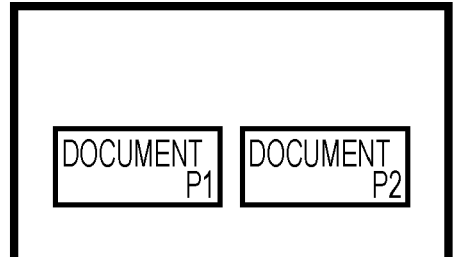
Figures 3, 3A:
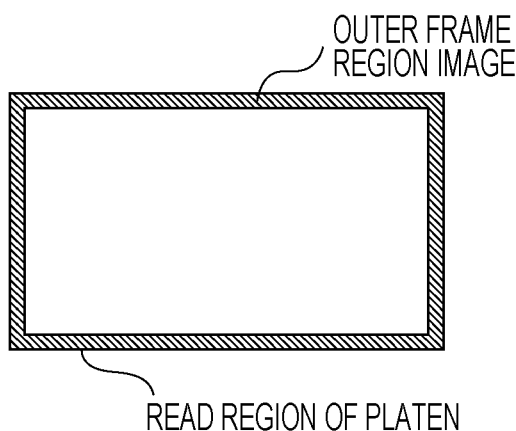
Figures 3, 3A, 4:
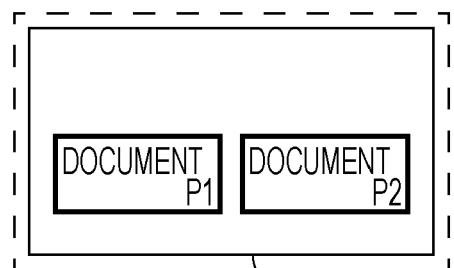
Figures 3, 3A, 4, 5:
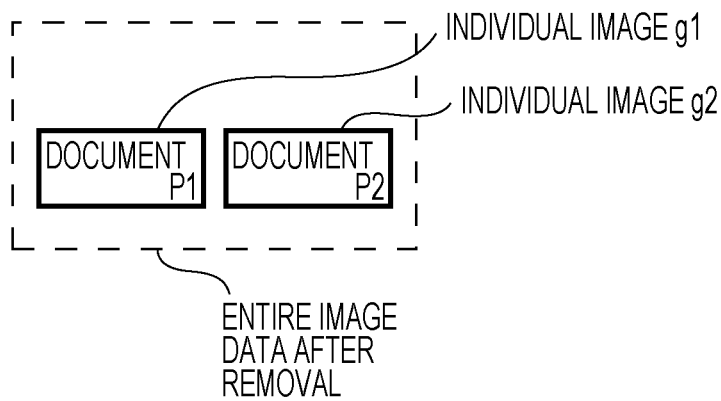

FIG. 3A-1 illustrates a state where two documents (P1 and P2) are positioned in the reading region of the platen so as not to overlap each other, in order to read two documents at the same time, as one example. Upon the user performing an input operation indicating to start reading with the platen cover left open after having positioned the two documents, processing is performed to scan the entire reading region of the platen. Thus, entire image data is obtained by the image input unit 13, as illustrated in FIG. 3A-2. The individual images of the two documents are included in this entire image data, and further there are cases where an image of the perimeter edge portion of the reading region of the platen is included as well.

Thereafter, processing to remove the outer frame region image is performed by the outer frame region removing unit 20. FIG. 3A-3 schematically illustrates an image corresponding to the portion of the outer frame region in the reading region of the platen (outer frame region image). Although the size of the outer frame region is identified by the above-described outer frame region information 51, the size is sufficiently large for the image of the perimeter edge portion of the reading region of the platen to be contained within this outer frame region. The outer frame region image contained in this outer frame region is removed from the obtained entire image data.

Figures 2, 2A, 3, 4:
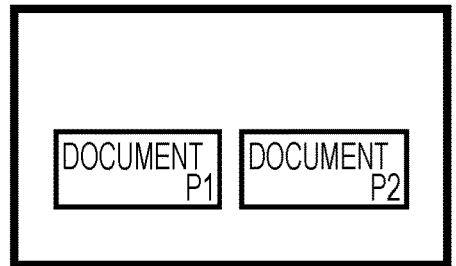

FIG. 3A-4 illustrates the entire image data after the outer frame region image in FIG. 3A-3 has been removed from the entire image data in FIG. 3A-2. The dotted line in FIG. 3A-4 indicates the reading region of the platen, and the solid line indicates the entire image data after the outer frame region image has been removed. Even if an image of the perimeter edge portion of the reading region of the platen is included in the obtained entire image data, if the image of the perimeter edge portion of the reading region of the platen is contained within the outer frame region image, no image of the perimeter edge portion of the reading region of the platen that would cause erroneous detection of documents will remain in the entire image data after this outer frame region image has been removed.

Next, the entire image data after removal of the outer frame region image, illustrated in FIG. 3A-4, is subjected to edge detection, position detection of individual images (coordinate acquisition), and individual image cropping processing, are performed in this order. Accordingly, image data after having cropped the individual images is obtained, as illustrated in FIG. 3A-5. For example, image data of individual image g1 is obtained with regard to the document P1, and image data of individual image g2 is obtained with regard to the document P2.

As described above, in a case of performing reading processing with the platen cover left open, cropping processing of individual images and so forth is performed using the entire image data after the outer frame region image has been removed, so the image within the outer frame region can be prevented from being erroneously detected as a single document. Although a case of cropping individual images of two documents at the same time is illustrated in FIGS. 3A-1 through 3A-5, the number of documents to be read is not restricted to two, and may be one, or may be three or more, regarding which individual images of the documents can be cropped at the same time by performing the same image processing.

FIGS. 4A-1 through 4A-6 are explanatory diagrams illustrating an example of obtaining image data of individual images after having removed the outer frame region. Unlike the case in FIGS. 3A-1 through 3A-5, FIGS. 4A-1 through 4A-6 illustrate a case of obtaining entire image data after the platen cover has been closed (in a closed state). Generally, when reading documents with many dark portions such as black, reading is preferably performed with the platen cover closed, to improve the precision of cropping individual images.

Figures 1, 4A:
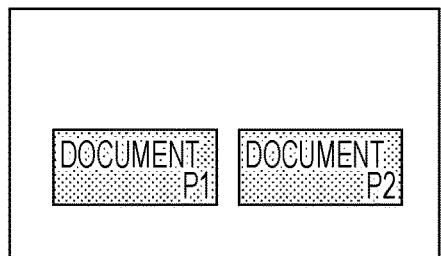
Figures 2, 4A:
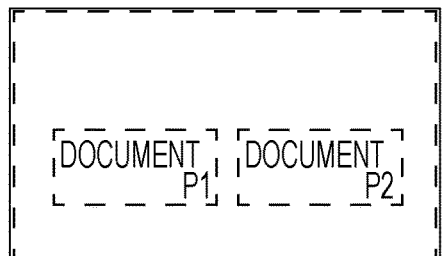
Figures 3, 4A:
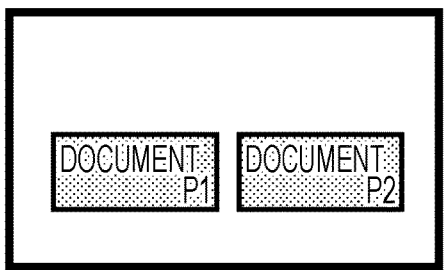
Figures 4, 4A:
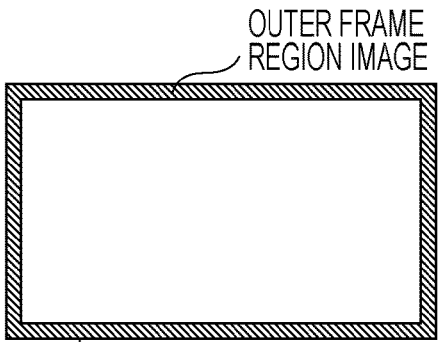
Figures 4, 4A, 5:
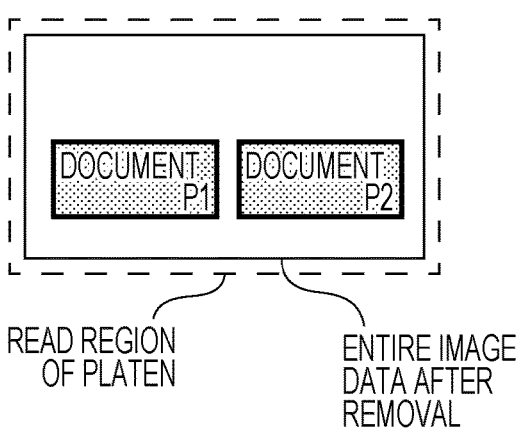

FIG. 4A-1 illustrates a state where two documents (P1 and P2) are positioned in the reading region of the platen so as not to overlap each other, in order to read two documents at the same time, in the same way as in FIG. 3A-1. The user, upon having placed the documents to be read, closes the platen cover. FIG. 4A-2 schematically illustrates the state where the platen cover is closed as viewed from above. The platen cover covers the reading region of the platen so reading light emitted from below the platen toward the platen cover is reflected by the platen cover and the documents, whereby image data of the entire reading region of the platen is obtained.

Thereafter, upon the user performing an input operation indicating to start reading, processing is performed to scan the entire reading region of the platen. Thus, entire image data is obtained by the image input unit 13, as illustrated in FIG. 4A-3. The individual images of the two documents are included in this entire image data, and further there are cases where an image of the perimeter edge portion of the reading region of the platen is included as well.

Thereafter, processing to remove the outer frame region image is performed by the outer frame region removing unit 20, in the same way as illustrated in FIGS. 3A-3 through 3A-5. FIG. 4A-4 schematically illustrates an image corresponding to the portion of the outer frame region (outer frame region image), the same as in FIG. 3A-3. The outer frame region image contained in this outer frame region is removed from the obtained entire image data.

Figures 2, 2A, 3, 4, 5:
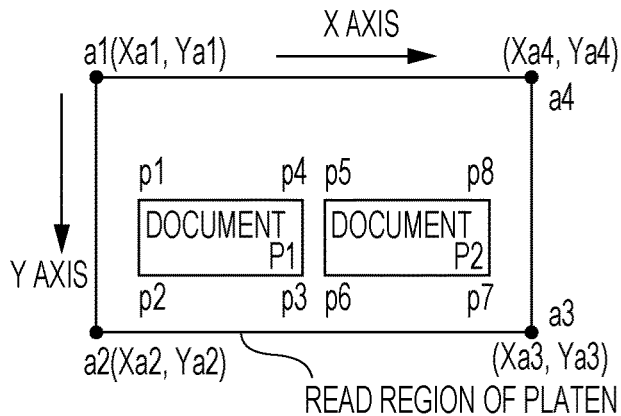

FIG. 4A-5 illustrates the entire image data after the outer frame region image in FIG. 4A-4 has been removed from the entire image data in FIG. 4A-3. The dotted line in FIG. 4A-5 indicates the reading region of the platen, and the solid line indicates the entire image data after the outer frame region image has been removed. If the image of the perimeter edge portion of the reading region of the platen is contained within the outer frame region image, no image of the perimeter edge portion of the reading region of the platen that would cause erroneous detection of documents will remain in the entire image data after this outer frame region image has been removed.

Next, the entire image data after removal of the outer frame region image, illustrated in FIG. 4A-5, is subjected to edge detection, position detection of individual images (coordinate acquisition), and individual image cropping processing, are performed in this order. Accordingly, image data after having cropped the individual images is obtained, as illustrated in FIG. 4A-6. For example, image data of individual image g1 is obtained with regard to the document P1, and image data of individual image g2 is obtained with regard to the document P2 in FIG. 4A-6, in the same way as in FIG. 3A-5.

As described above, even in a case of performing reading processing with the platen cover closed, cropping processing of individual images and so forth is performed using the entire image data after the outer frame region image has been removed, so the image within the outer frame region can be prevented from being erroneously detected as a single document.

Second Example

Figures 1, 5A:
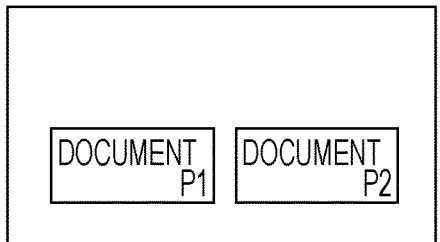
Figures 2, 5A:
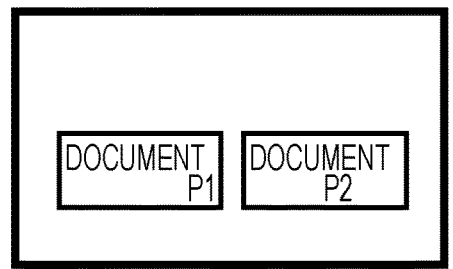
Figures 3, 5A:
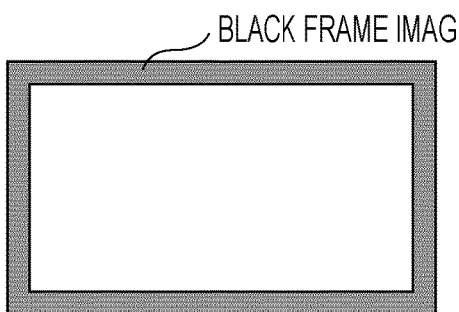
Figures 4, 5A:
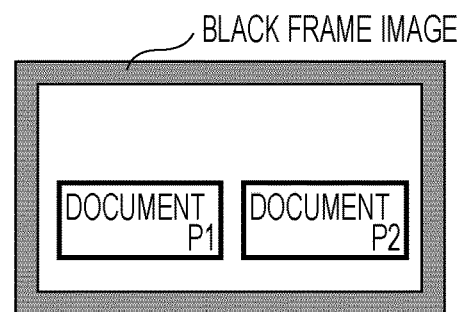
Figures 5, 5A:
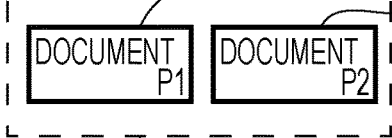

FIGS. 5A-1 through 5A-5 are explanatory diagrams illustrating an example of obtaining image data of individual images after having added a black frame image to the outer frame region. FIGS. 5A-1 through 5A-5 illustrate a case of obtaining entire image data with the platen cover open (in an opened state), in the same way as in FIGS. 3A-1 through 3A-5.

FIG. 5A-1 is the same drawing as FIG. 3A-1, and illustrates a state where two documents are positioned in the reading region of the platen. Upon the user performing an input operation indicating to start reading with the platen cover left open after having positioned the two documents, processing is performed to scan the entire reading region of the platen. FIG. 5A-2 is the same drawing as FIG. 3A-2, illustrating the entire image data obtained by the image input unit 13. The individual images of the two documents are included in this entire image data, and further there are cases where an image of the perimeter edge portion of the reading region of the platen is included as well.

Thereafter, processing to add the black frame image to the outer frame region in the entire image data is performed by the black-frame image adding unit 31. FIG. 5A-3 illustrates a schematic example of a black frame image to be added to the portion corresponding to the outer frame region in the reading region of the platen. Although the size of the outer frame region is identified by the above-described outer frame region information 51, the size is sufficiently large for the image of the perimeter edge portion of the reading region of the platen to be contained within this outer frame region. The image data of the outer frame region portion in the obtained entire image data is replaced with the black frame image.

FIG. 5A-4 illustrates the entire image data after the black frame image in FIG. 5A-3 has been added to the outer frame region in the entire image data in FIG. 5A-2. The entire image data after the black frame image has been added is made up of image data on the inner side of the outer frame region, and the black frame image added to the outer frame region. Even if an image of the perimeter edge portion of the reading region of the platen is included in the obtained entire image data, if the image of the perimeter edge portion of the reading region of the platen is contained within the outer frame region image, no image of the perimeter edge portion of the reading region of the platen that would cause erroneous detection of documents will remain in the entire image data after the black frame image has been added to this outer frame region image.

Next, the entire image data after addition of the black frame image, illustrated in FIG. 5A-4, is subjected to edge detection, position detection of individual images (coordinate acquisition), and individual image cropping processing, are performed in this order. Accordingly, image data after having cropped the individual images is obtained, as illustrated in FIG. 5A-5. For example, image data of individual image g1 is obtained with regard to the document P1, and image data of individual image g2 is obtained with regard to the document P2.

As described above, in a case of performing reading processing with the platen cover left open, cropping processing of individual images and so forth is performed using the entire image data after the black frame image has been added, so the image within the outer frame region can be prevented from being erroneously detected as a single document.

Figures 4, 4A, 5, 6:
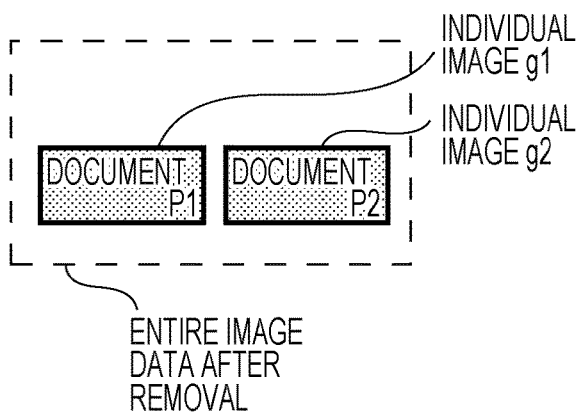
Figures 1, 6A:
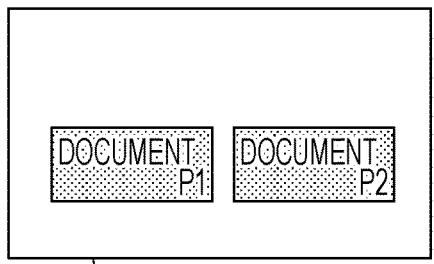
Figures 2, 6A:
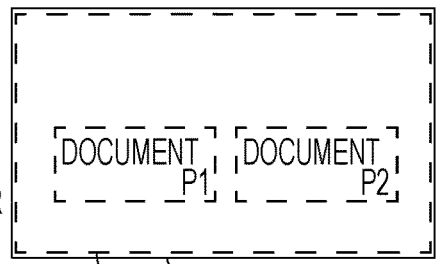
Figures 3, 6A:
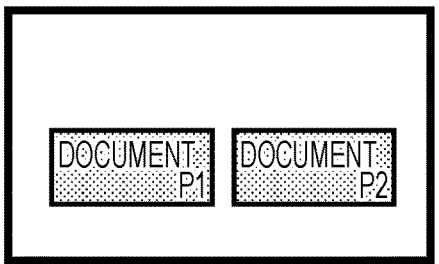
Figures 4, 6A:
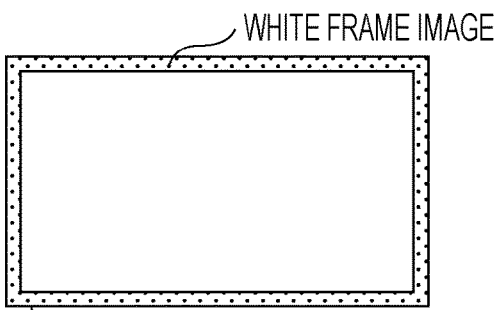
Figures 5, 6A:
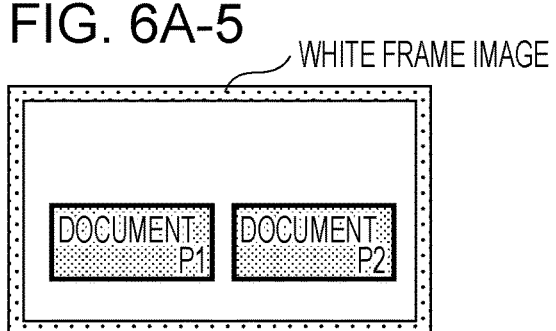
Figures 6, 6A:
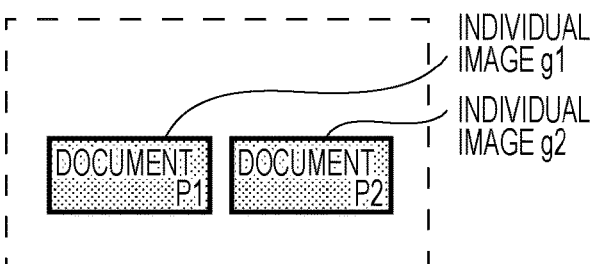

FIGS. 6A-1 through 6A-6 are explanatory diagrams illustrating an example of obtaining image data of individual images after having added a white frame image to the outer frame region. Unlike the case in FIGS. 5A-1 through 5A-5, FIGS. 6A-1 through 6A-6 illustrate a case of obtaining entire image data after the platen cover has been closed (in a closed state). Generally, when reading documents with many dark portions such as black, reading is preferably performed with the platen cover closed, to improve the precision of cropping individual images.

FIG. 6A-1 illustrates a state where two documents (P1 and P2) are positioned in the reading region of the platen so as not to overlap each other, in the same way as in FIG. 4A-1. The user, upon having placed the documents to be read, closes the platen cover. FIG. 6A-2 schematically illustrates the state where the platen cover is closed as viewed from above, in the same way as in FIG. 4A-2.

Thereafter, upon the user performing an input operation indicating to start reading, processing is performed to scan the entire reading region of the platen. Thus, entire image data is obtained by the image input unit 13, as illustrated in FIG. 6A-3. FIG. 6A-3 is the same drawing as FIG. 4A-3, illustrating the entire image data obtained by the image input unit 13. The individual images of the two documents are included in this entire image data, and further there are cases where an image of the perimeter edge portion of the reading region of the platen is included as well.

Thereafter, processing to add the white frame image to the outer frame region of the entire image data is performed by the white-frame image adding unit 32. FIG. 6A-4 illustrates a schematic example of a white frame image to be added to the portion corresponding to the outer frame region in the reading region of the platen. Although the size of the outer frame region is identified by the above-described outer frame region information 51, the size is sufficiently large for the image of the perimeter edge portion of the reading region of the platen to be contained within this outer frame region. The image data of the outer frame region portion in the obtained entire image data is replaced with the white frame image.

FIG. 6A-5 illustrates the entire image data after the white frame image in FIG. 6A-4 has been added to the outer frame region in the entire image data in FIG. 6A-3. The entire image data after the white frame image has been added is made up of image data on the inner side of the outer frame region, and the white frame image added to the outer frame region. Even if an image of the perimeter edge portion of the reading region of the platen is included in the obtained entire image data, if the image of the perimeter edge portion of the reading region of the platen is contained within the outer frame region image, no image of the perimeter edge portion of the reading region of the platen that would cause erroneous detection of documents will remain in the entire image data after the white frame image has been added to this outer frame region image.

Next, the entire image data after addition of the white frame image, illustrated in FIG. 6A-5, is subjected to edge detection, position detection of individual images (coordinate acquisition), and individual image cropping processing, are performed in this order. Accordingly, image data after having cropped the individual images is obtained, as illustrated in FIG. 6A-6. For example, image data of individual image g1 is obtained with regard to the document P1, and image data of individual image g2 is obtained with regard to the document P2.

As described above, in a case of performing reading processing after having closed the platen cover, cropping processing of individual images and so forth is performed using the entire image data after the white frame image has been added, so the image within the outer frame region can be prevented from being erroneously detected as a single document.

Flowchart of Read-Image Processing in First Example

Figure 8:
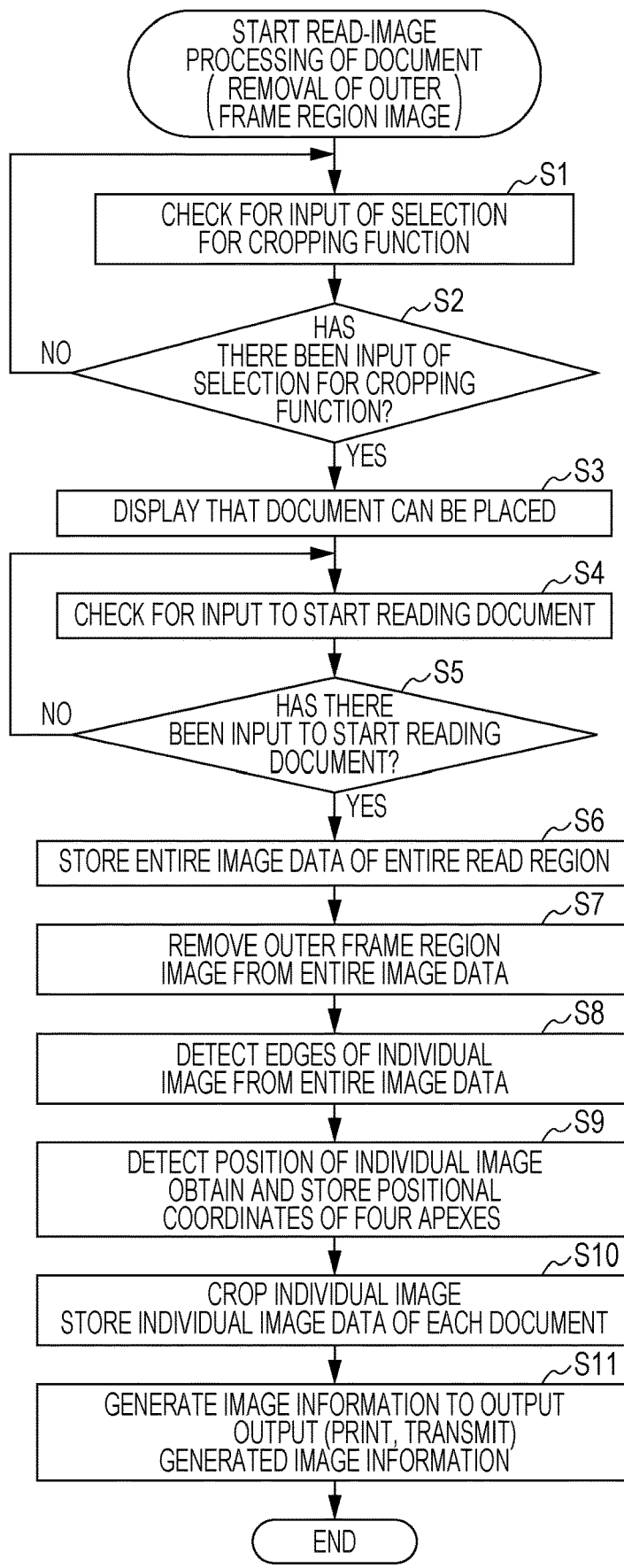
FIG. 8 is a flowchart of an example of read image processing of a document in the image processing device according to the present disclosure.

FIG. 8 illustrates a flowchart of read-image processing of documents, in the above-described first example of the image processing device according to the present disclosure. Processing for removing the outer frame region image from the obtained entire image data and cropping individual images of the documents, as in the above-described first example, will be described here. First, in order to perform processing of cropping individual images of the documents placed on the platen, the user uses the operating unit 12 to, for example, perform input to select the crop function out of the functions that the image processing device has, to execute this function.

In step S1 in FIG. 8, the control unit 11 checks whether or not there has been input to select the crop function that executes cropping processing of the individual images of the documents. In a case where there has been input to select the crop function in step S2, the flow advances to step S3. Otherwise, the flow returns to step S1.

In step S3, the control unit 11 displays information on the display unit 14 to the effect that documents to be read can be placed on the platen. Display is also preferably made at this time to the effect that it would be better to start reading with the platen cover left open if the documents to be read have a great deal of whitish colors, but it would be better to close the platen cover and then start reading if the documents to be read have a great deal of dark colors such as photographs, and so forth. The user views this display and places the documents on the reading region of the platen, and either leaves the platen cover open, or closes the platen cover and then performs input operations indicating to start reading of the documents.

In step S4, the control unit 11 checks whether or not there has been an input operation made by the user indicating to start reading the documents. In a case where there has been input indicating to start reading the documents in step S5, the flow advances to step S6. Otherwise, the flow returns to step S4.

In step S6, the image input unit 13 scans the entire reading region of the platen, obtains image data of the entire reading region, and temporarily stores this in the storage unit 50 as entire image data 53.

In step S7, the outer frame region removing unit 20 removes the outer frame region image from the obtained entire image data. In the removing of the outer frame region image, the image data of the outer frame region portion set by the outer frame region information 51 (outer frame region image) is removed from the entire image data, as illustrated in FIGS. 3A-4, 3A-5, 4A-5, and 4A-6, as described above.

In step S8, the document edge detecting unit 17 may detect the edges of individual images in the entire image data after the outer frame region image has been removed. If the documents are rectangular in shape, the four sides of the rectangles corresponding to the outlines of the documents are detected by difference in darkness/lightness of image data between the documents and portions where there are no documents.

In step S9, the individual image coordinates obtaining unit 18 uses the four sides of the rectangles corresponding to the outline of the documents detected by the document edge detecting unit 17 to acquire the position coordinates of the four apices of the individual images, and stores these as the document apex position coordinates of the individual images. In a case where multiple documents have been placed, the document apex position coordinates of the individual images corresponding to the documents are respectively stored. For example, input image Nos. of the individual images and document apex position coordinates are stored in a correlated manner as individual image data 57.

In step S10, the individual image cropping unit 19 uses the document apex position coordinates of the individual images that have been stored, and crop the individual images of the documents from the entire image data. The image data of the individual images of the cropped documents is correlated with the input image Nos. as individual image information 57, and stored in the storage unit 50 for each individual image.

In step S11, in a case of performing output such as printing individual images or the like, the output unit 15 uses the individual image information 57 stored in the storage unit 50 to generate image information to be output, corresponding to a predetermined output format. The output unit 15 also outputs the generated image information. Examples include printing processing by a printer and transmission processing over a network.

As described above, after removing the outer frame region image from the obtained entire image data, individual images are cropped using entire image data from which the outer frame region image has been removed, so the probability of successfully cropping individual images can be improved, regardless of whether the platen cover is open or closed.

First Flowchart of Read-Image Processing in Second Example

Figure 9A:
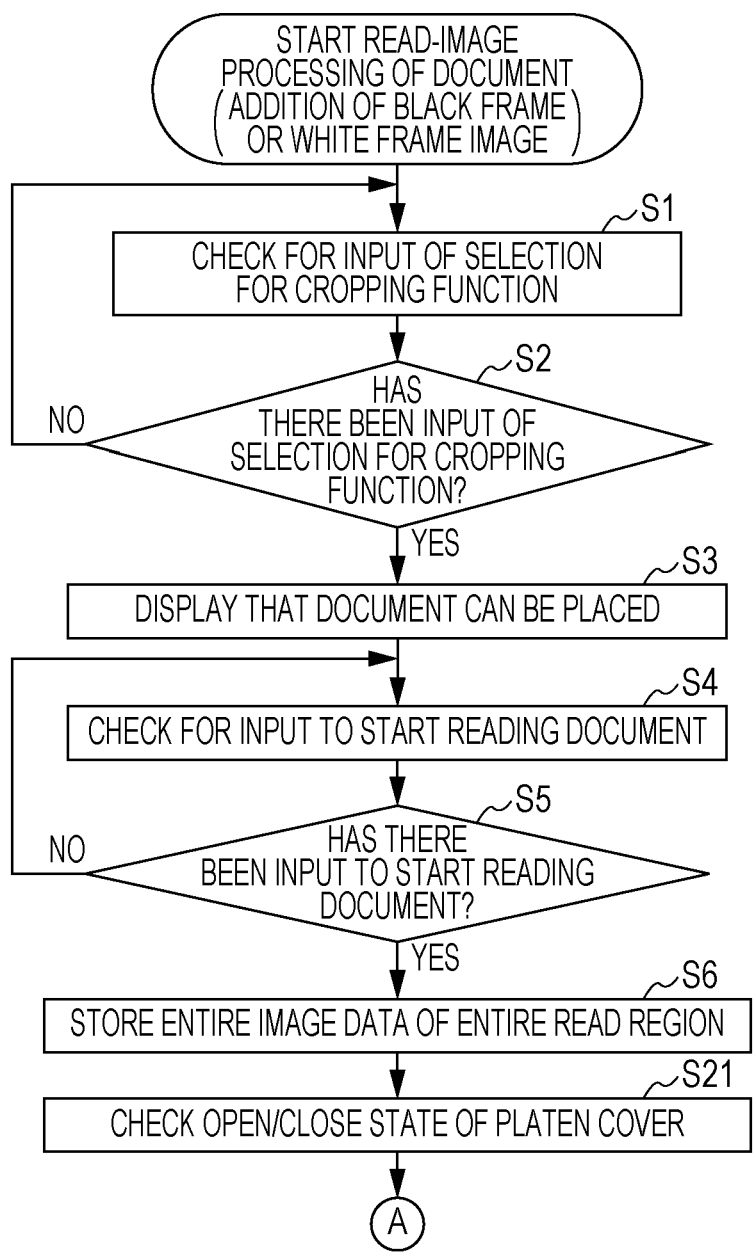
FIGS. 9A and 9B is a flowchart of an example of read image processing of a document in the image processing device according to the present disclosure.
Figure 9B:
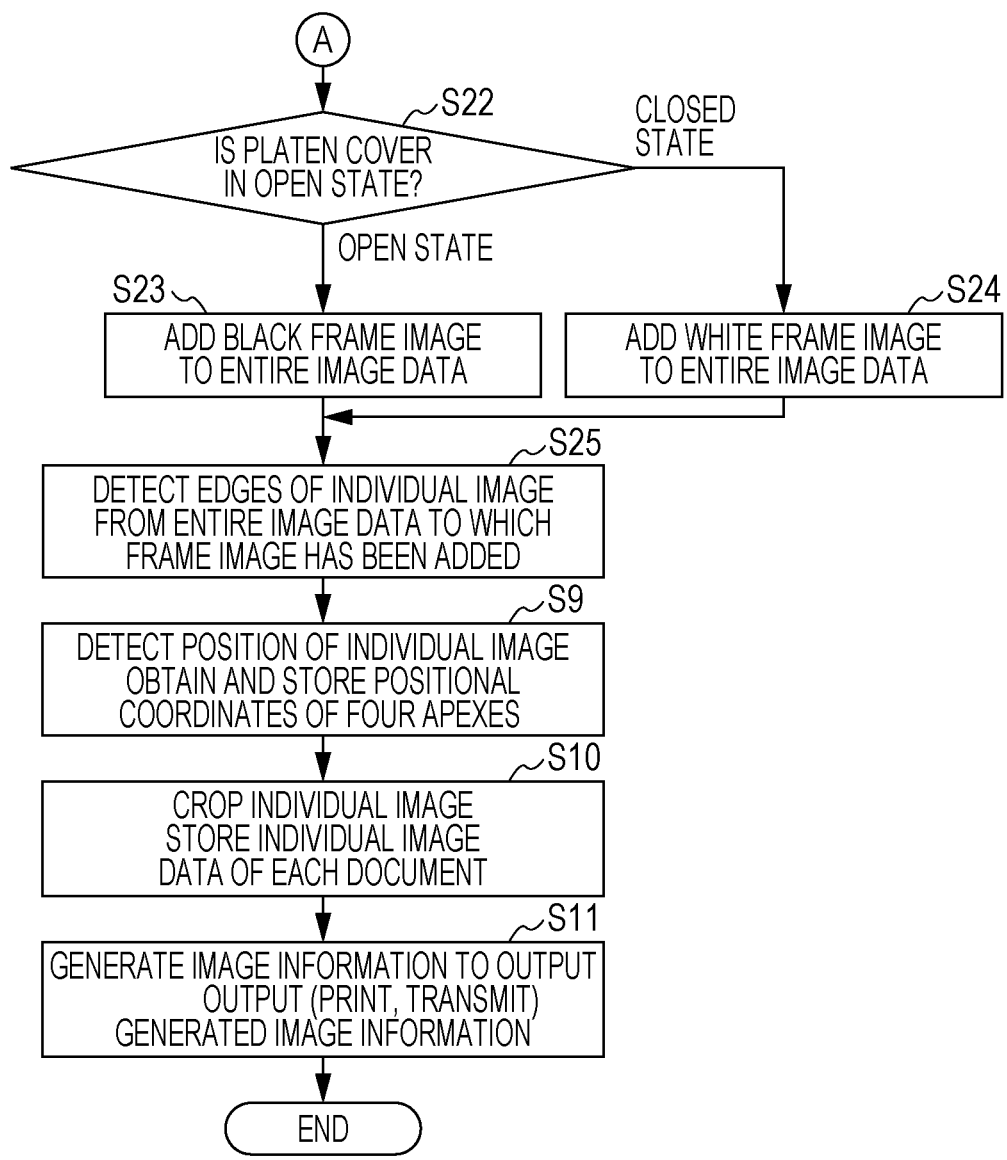

FIGS. 9A and 9B illustrate a flowchart of read-image processing of documents, in the above-described second example of the image processing device according to the present disclosure. Processing for adding a black frame image or a white frame image to the outer frame region of the entire image data and cropping individual images, as in the above-described second example, will be described here. First, the user uses the operating unit 12 to perform input to select the crop function for cropping individual images of the documents placed on the platen, in the same way as in FIG. 8. Steps in FIGS. 9A and 9B that are the same as steps in FIG. 8 are denoted by the same step Nos.

In FIG. 9A, the same processing as in FIG. 8 is performed from step S1 through step S6. That is to say, in step S1, whether or not there has been input to select the crop function is checked, and in a case where there has been input to select the crop function, the flow advances to step S3.

In step S3, the control unit 11 displays information on the display unit 14 to the effect that documents to be read can be placed on the platen. Display is also preferably made at this time to the effect that it would be better to start reading with the platen cover left open if the documents to be read have a great deal of whitish colors, but it would be better to close the platen cover and then start reading if the documents to be read have a great deal of dark colors such as photographs, and so forth. The user views this display and places the documents on the reading region of the platen, and either leaves the platen cover open, or closes the platen cover and then performs input operations indicating to start reading of the documents.

In step S4, whether or not there has been an input operation made by the user indicating to start reading the documents is checked, and in a case where there has been input indicating to start reading the documents in step S5, the flow advances to step S6. Otherwise, the flow returns to step S4.

In step S6, the image input unit 13 scans the entire reading region of the platen, obtains image data of the entire reading region, and temporarily stores this in the storage unit 50 as entire image data 53.

In step S21, the platen cover open/close detection unit 16 checks the open/close state of the platen cover. In a case where the platen cover is in the open state in step S22, the flow advances to step S23, and in a case of a closed state, advances to step S24.

In step S23, a black frame image is added to the output entire image data, and the flow advances to step S25. Thus, the entire image data to which the black frame image has been added to the outer frame region is generated, as illustrated in FIG. 5A-4 described above.

In step S24, a white frame image is added to the output entire image data, and the flow advances to step S25. Thus, the entire image data to which the white frame image has been added to the outer frame region is generated, as illustrated in FIG. 6A-5 described above.

In step S25, the document edge detecting unit 17 may detect the edges of individual images in the entire image data to which a frame image (black frame image or white frame image) has been added. Thereafter, the processing of steps S9 through S11 is performed in the same way as in FIG. 8. That is to say, in step S9, the individual image coordinates obtaining unit 18 uses the four sides of the rectangles corresponding to the outline of the documents detected by the document edge detecting unit 17 to acquire the position coordinates of the four apices of the individual images (document apex position coordinates), and stores the input image Nos. of the individual images correlated with the document apex position coordinates, as individual image information 57.

In step S10, the individual image cropping unit 19 uses the document apex position coordinates of the individual images that have been stored, and crop image data of the individual images of the documents from the entire image data. The image data of the individual images of the cropped documents is correlated with the input image Nos. as individual image information 57, and stored in the storage unit 50 for each individual image.

In step S11, in a case of performing output such as printing individual images or the like, the output unit 15 uses the individual image information 57 stored in the storage unit 50 to generate image information to be output, corresponding to a predetermined output format. The output unit 15 also outputs the generated image information. Examples include printing processing by a printer and transmission processing over a network.

As described above, after adding a black frame image or a white frame image to the outer frame region portion in the obtained entire image data, individual images are cropped using entire image data to which the black frame image or white frame image has been added, so the probability of successfully cropping individual images can be improved. Also, cropping of individual images is performed with a black frame image or a white frame image having been automatically added in accordance with the open/close state of the platen cover that the user has operated, so the user does not need to input settings regarding image processing to be performed in accordance with the open/close state of the platen cover, and all that has to be performed is opening/closing operations of the platen cover, input to select the crop function, and input to start reading of the documents. These operations are similar to operations normally performed with MFPs and the like, so the user can obtain individual images with simple operations, without having to perform complicated operations to input settings, and the load of operations on the user can be lightened.

Second Flowchart of Read-Image Processing in Second Example

Figure 10A:
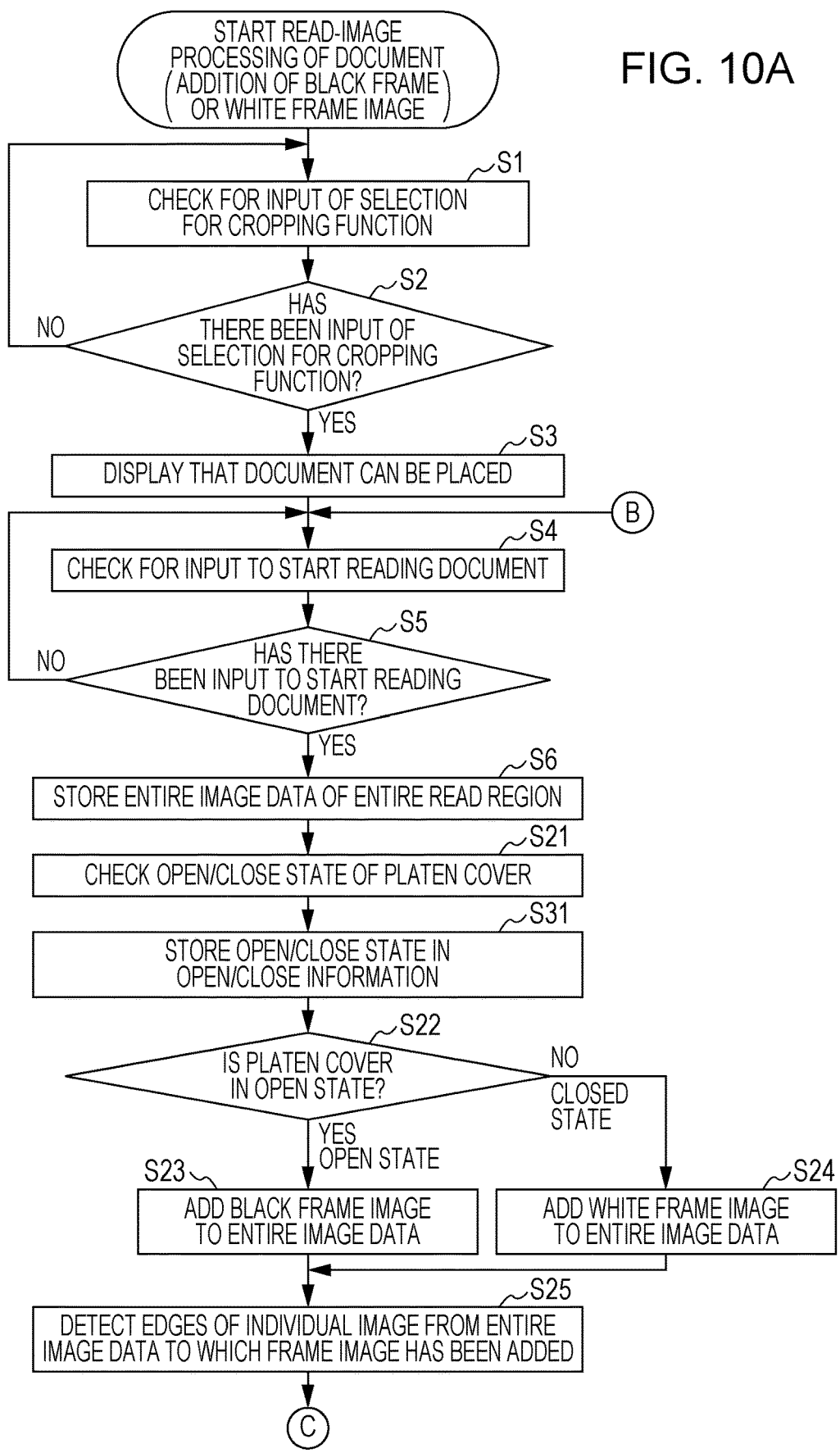
FIGS. 10A and 10B is a flowchart of an example of read image processing of a document in the image processing device according to the present disclosure.
Figure 10B:
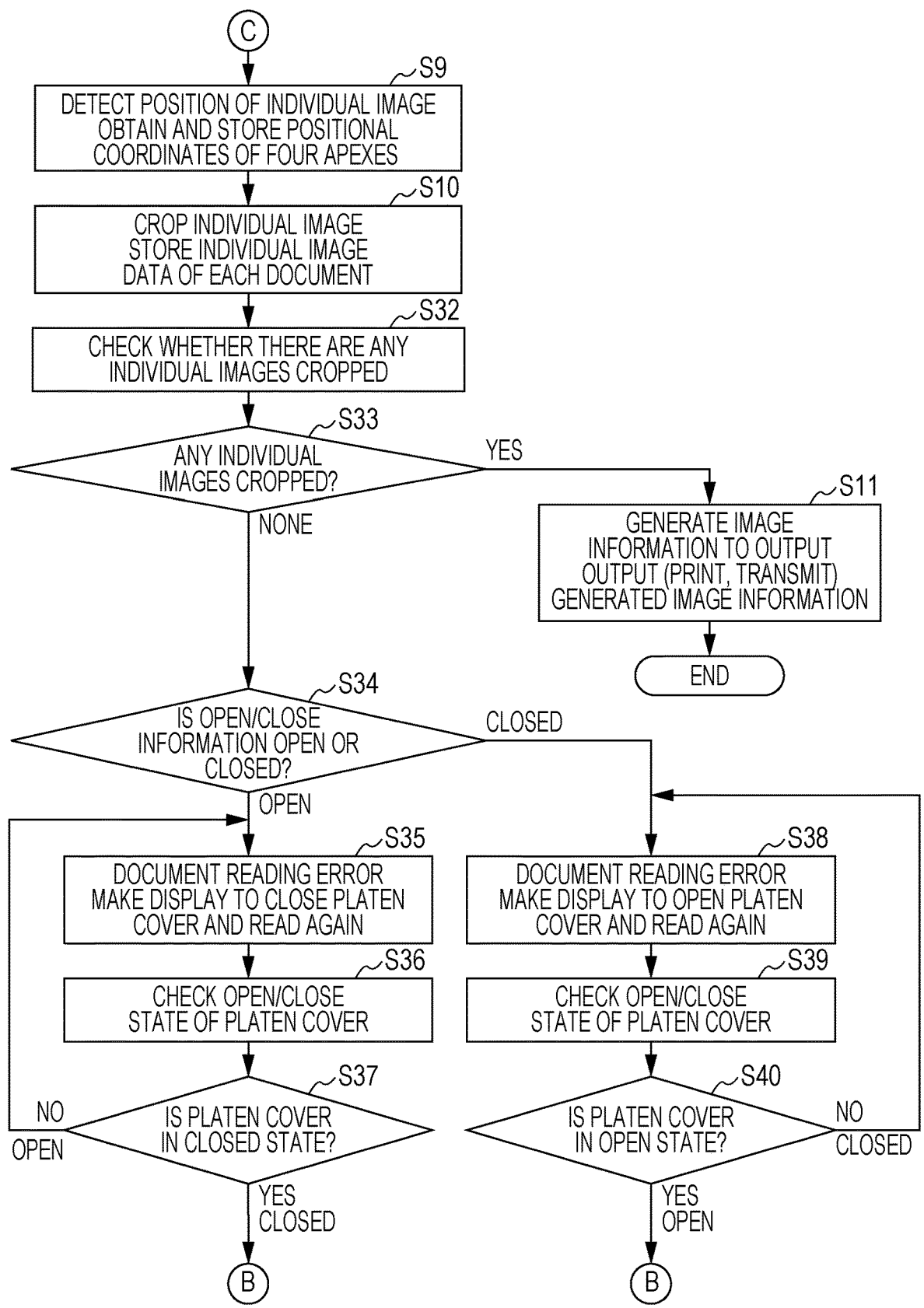

FIGS. 10A and 10B illustrate a flowchart of read-image processing of documents, in the above-described second example of the image processing device according to the present disclosure in the same way as with FIGS. 9A and 9B. However, while a black frame image or a white frame image is added to the outer frame region of the entire image data here, in a case where cropping individual images is not able to be performed, the open/close state of the platen cover is reversed, and read-image processing of documents is performed again.

Depending on the color or darkness/lightness of documents to be read, there are cases where cropping of individual images of the documents may be successful by switching the open/close state of the platen cover from the open state to the closed state, or conversely switching from the closed state to the open state. Accordingly, in a case where cropping of individual images is unsuccessful, a message is displayed requesting the user to change the open/close state of the platen cover. The user preforms operation to change the open/close state of the platen cover, and read-image processing of documents is performed again. Having the user to change the open/close state of the platen cover increases the probability that cropping of individual images of the documents will succeed.

Steps in FIGS. 10A and 10B that are the same as steps in FIGS. 8 through 9B are denoted by the same step Nos. In FIG. 10A, the same processing as in FIG. 9A is performed from step S1 through step S6 and step S21. That is to say, in step S1, whether or not there has been input to select the crop function is checked, and in a case where there has been input to select the crop function, the flow advances to step S3.

In step S3, the control unit 11 displays information on the display unit 14 to the effect that documents to be read can be placed on the platen. Display is also preferably made at this time to the effect that it would be better to start reading with the platen cover left open if the documents to be read have a great deal of whitish colors, but it would be better to close the platen cover and then start reading if the documents to be read have a great deal of dark colors such as photographs, and so forth. The user views this display and places the documents on the reading region of the platen, and either leaves the platen cover open, or closes the platen cover and then performs input operations indicating to start reading of the documents.

In step S4, whether or not there has been an input operation made by the user indicating to start reading the documents is checked, and in a case where there has been input indicating to start reading the documents in step S5, the flow advances to step S6. Otherwise, the flow returns to step S4.

In step S6, the image input unit 13 scans the entire reading region of the platen, obtains image data of the entire reading region, and temporarily stores this in the storage unit 50 as entire image data 53.

In step S21, the platen cover open/close detection unit 16 checks the open/close state of the platen cover.

In step S31, the current open/close state of the platen cover detected by the above checking is stored in the storage unit 50 as open/close information 52. Note however, that the processing of step S21 and step S31 is constantly executed as separate multitasking, and the current open/close state of the platen cover is stored as the open/close information 52.

Next, in a case where the platen cover is in the open state in step S22, the flow advances to step S23, and in a case of a closed state, advances to step S24, in the same way as in FIG. 9B.

In step S23, a black frame image is added to the output entire image data, and the flow advances to step S25. Thus, the entire image data to which the black frame image has been added to the outer frame region is generated, as illustrated in FIG. 5A-4 described above.

In step S24, a white frame image is added to the output entire image data, and the flow advances to step S25. Thus, the entire image data to which the white frame image has been added to the outer frame region is generated, as illustrated in FIG. 6A-5 described above.

In step S25, the document edge detecting unit 17 may detect the edges of individual images in the entire image data to which a frame image (black frame image or white frame image) has been added. Thereafter, the processing of steps S9 and S10 is performed in the same way as in FIG. 8. That is to say, in step S9, the individual image coordinates obtaining unit 18 uses the four sides of the rectangles corresponding to the outline of the documents detected by the document edge detecting unit 17 to acquire the position coordinates of the four apices of the individual images (document apex position coordinates), and stores the input image Nos. of the individual images correlated with the document apex position coordinates, as individual image information 57.

In step S10, the individual image cropping unit 19 uses the document apex position coordinates of the individual images that have been stored, and crops the image data of the individual images of the documents from the entire image data. The image data of the individual images of the cropped documents is correlated with the input image Nos. as individual image information 57, and stored in the storage unit 50 for each individual image. However, in a case where detection of edges of individual images in step S25 is insufficient, such as cases where the edges serving as the outlines of individual images are not straight lines for example, cases where edge information is broken partway and a two-dimensional shape such as a rectangle is not able to be identified, or cases where a detected rectangle is smaller than a predetermined size decided beforehand, individual images may not be able to be cropped in step S10.

In step S32, whether or not there are cropped individual images is checked. The individual image information 57 stored in the storage unit 50 is confirmed, and in a case where one or more individual image is stored in the individual image information 57, judgment is made that there is a cropped individual image. In a case where no individual image is stored, judgment is made that there are no cropped individual images.

In a case where judgment is made in step S33 that there are not cropped individual images, the flow advances to step S34, and in a case where judgment is made that there is a cropped individual image, the flow advances to step S11. Judgement that there are not cropped individual images means that cropping of individual images has failed.

In step S11, in a case of performing output such as printing individual images or the like, the output unit 15 uses the individual image information 57 stored in the storage unit 50 to generate image information to be output, corresponding to a predetermined output format, and outputs image information that has been generated. For example, printing processing by a printer or transmission processing over a network is performed. This ends the series of read processing.

In step S34, whether the current open/close information 52 is "open" or "closed" is checked. In a case where the open/close information 52 is "open", the flow advances to step S35, and in a case where the open/close information 52 is "closed", the flow advances to step S38.

In step S35, a display is made on the display unit 14 to the effect that a read error of a document has occurred, and that reading is to be performed again with the platen cover closed. In this case, the platen cover currently is in the open state, but there are cases where reading of the document will be successful if the platen cover is closed and reading is executed again. Accordingly, the user is notified to leave the documents placed as they are, and to close the platen cover. An arrangement may be made where a speaker is provided, and in a case where there are audio output functions, the content to be displayed may be announced by audio. The user can view the display such as described above, and close the platen cover.

In step S36, the platen cover open/close detection unit 16 checks the open/close state of the platen cover, the same as in step S21. In a case where the state of the platen cover has transitioned to the closed state in step S37, the flow returns to step S4, and the reading processing of step S4 and thereafter is executed. If the platen cover is still in the open state, the flow returns to step S35.

In step S38, a display is made on the display unit 14 to the effect that a read error of a document has occurred, and that reading is to be performed again with the platen cover open. In this case, the platen cover currently is in the closed state, but there are cases where reading of the document will be successful if the platen cover is opened and reading is executed again. Accordingly, the user is notified to leave the documents placed as they are, and to open the platen cover. In this case was well, the content to be displayed may be announced by audio using a speaker. The user can view the display such as described above, and open the platen cover.

In step S39, the platen cover open/close detection unit 16 checks the open/close state of the platen cover, the same as in step S21. In a case where the state of the platen cover has transitioned to the open state in step S40, the flow returns to step S4, and the reading processing of step S4 and thereafter is executed. If the platen cover is still in the closed state, the flow returns to step S38.

According to the above processing, in a case where cropping of individual images has failed once, the user is prompted to perform an operation to change the open/close state of the platen cover, and cropping processing of individual images is performed in accordance with the open/closed state of the platen cover after changing, so the probability of succeeding in cropping of individual images of documents can be improved. In a case of performing reading processing again, the user only has to perform an operation of changing the open/close state of the platen cover from open to closed, or perform an operation to change from closed to open, so the operation load on the user is small.

The present disclosure contains subject matter related to that disclosed in Japanese Priority Patent Application JP 2017-214605 filed in the Japan Patent Office on Nov. 7, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device, comprising:
   a platen on which documents to be read are placed;
   a platen cover configured to cover documents placed on the platen;
   an image input unit configured to read in one or a plurality of documents placed on the platen at one time;
   a storage unit configured to store entire image data including individual images of the documents read in at one time;
   a platen cover open/close detection unit configured to detect an open/close state of the platen cover;
   a frame image adding unit configured to add, to an outer frame region of the entire image data at a perimeter edge portion of the platen having a predetermined width, a frame image of a predetermined color, in accordance with the detected open/close state of the platen cover; and
   an individual image cropping unit configured to crop individual images of the one or the plurality of documents, from the entire image data after which the frame image has been added to the outer frame region,
   wherein the frame image adding unit includes
      a black-frame image adding unit configured to add, to the outer frame region of the entire image data stored in the storage unit, a black frame image made of image data of a black color, and
      a white-frame image adding unit configured to add, to the outer frame region of the entire image data stored in the storage unit, a white frame image made of image data of a white color.

2. The image processing device according to claim 1,
   wherein, in a case where the platen cover open/close detection unit detects that the platen cover is in an open state, the black-frame image adding unit adds the black frame image to the outer frame region of the entire image data,
   and wherein, in a case where the platen cover open/close detection unit detects that the platen cover is in a closed state, the white-frame image adding unit adds the white frame image to the outer frame region of the entire image data.

3. The image processing device according to claim 1, further comprising:
   a display unit,
   wherein, in a case where the individual image cropping unit is not able to crop an individual image of a document from entire image data after having added the frame image,
      in a case where the platen cover is in a closed state, a display is made on the display unit to the effect to place the platen cover in an opened state and perform reading again, and
      in a case where the platen cover is in an open state, a display is made on the display unit to the effect to place the platen cover in a closed state and perform reading again,
   and wherein, in a case where changing of the open/close state of the platen cover is detected by the platen cover open/close detection unit, the image input unit reads in documents placed on the platen at one time.

4. The image processing device according to claim 1, further comprising:
   a document edge detecting unit configured to detect outlines of individual images corresponding to the documents, from the entire image data after which the frame image has been added to the outer frame region in the entire image data stored in the storage unit,
   wherein, in a case where the document edge detecting unit has been able to detect outlines of individual images corresponding to the documents, positions of individual images are identified from the outlines of the individual images that have been detected, and the individual image cropping unit crops the individual images regarding which positions have been identified.

5. An image processing method of an image processing device, the method comprising:
   reading in one or a plurality of documents placed on a platen of the image processing device on which documents to be read are placed at one time;
   storing entire image data including individual images of the documents read in at one time;
   detecting an open/close state of a platen cover of the image processing device configured to cover documents placed on the platen when the documents are read in at one time;
   adding, to an outer frame region of the entire image data after storing at a perimeter edge portion of the platen having a predetermined width, a frame image of a predetermined color, in accordance with the detected open/close state of the platen cover; and
   cropping individual images of the one or the plurality of documents, from the entire image data after which the frame image has been added to the outer frame region,
   wherein, when detecting the open/close state of the platen cover,
      a black frame image is added to the outer frame region of the entire image data in a case of detecting the platen cover being in an open state, and
   a white frame image is added to the outer frame region of the entire image data in a case of detecting the platen cover being in a closed state.

* * * * *